US009477056B2

(12) United States Patent
Abernathy et al.

(10) Patent No.: US 9,477,056 B2
(45) Date of Patent: *Oct. 25, 2016

(54) FIBER OPTIC CABLES AND ASSEMBLIES FOR FIBER TOWARD THE SUBSCRIBER APPLICATIONS

(71) Applicant: Corning Optical Communications LLC, Hickory, NC (US)

(72) Inventors: George Cornelius Abernathy, Hildebran, NC (US); Rodney Maurice Burns, Conover, NC (US); Michael John Gimblet, Conover, NC (US); Warren Welborn McAlpine, Hickory, NC (US); Allen Michael Miller, Lenoir, NC (US); David Alan Seddon, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,364

(22) Filed: Mar. 12, 2014

(65) Prior Publication Data

US 2015/0277075 A1 Oct. 1, 2015

Related U.S. Application Data

(63) Continuation of application No. 13/950,718, filed on Jul. 25, 2013, now Pat. No. 8,712,200, which is a continuation of application No. 13/051,760, filed on Mar. 18, 2011, now Pat. No. 8,538,216, which is a
(Continued)

(51) Int. Cl.
*G02B 6/44* (2006.01)

(52) U.S. Cl.
CPC ............ *G02B 6/4427* (2013.01); *G02B 6/4402* (2013.01); *G02B 6/447* (2013.01); *G02B 6/4433* (2013.01); *G02B 6/4465* (2013.01)

(58) Field of Classification Search
None
See application file for complete search history.

(56) References Cited

U.S. PATENT DOCUMENTS

| 3,887,265 A | 6/1975 | Margolis et al. ............... 350/96 |
| 4,359,598 A | 11/1982 | Dey et al. ........................ 174/40 |

(Continued)

FOREIGN PATENT DOCUMENTS

| EP | 0784220 A1 | 7/1997 | ............... G02B 6/44 |
| EP | 2338076 B1 | 7/2013 | |

(Continued)

OTHER PUBLICATIONS

Patent Cooperation Treaty, International Search Report for International Application No. PCT/US2009/058017; Mailing date Mar. 10, 2010—2 pages.

(Continued)

*Primary Examiner* — Omar R Rojas
(74) *Attorney, Agent, or Firm* — William D. Doyle

(57) ABSTRACT

A fiber optic cable includes an optical fiber, strength components disposed on opposite sides of the optical fiber, and a polymeric cable jacket. The optical fiber includes a glass core, a glass cladding, and a polymer coating. The cable jacket surrounds the optical fiber and the strength components. Further, the cable jacket is tightly drawn onto the optical fiber, where excess fiber length of the optical fiber is such that positive strain is present in the optical fiber at room temperature (25° C.).

7 Claims, 33 Drawing Sheets

Related U.S. Application Data continuation of application No. PCT/US2009/058017, filed on Sep. 23, 2009.

(60) Provisional application No. 61/163,948, filed on Mar. 27, 2009, provisional application No. 61/192,925, filed on Sep. 23, 2008.

(56) References Cited

U.S. PATENT DOCUMENTS

| | | | |
|---|---|---|---|
| 4,401,361 A | 8/1983 | Slaughter | 350/96.23 |
| 4,420,220 A | 12/1983 | Dean et al. | 350/96.23 |
| 4,468,089 A | 8/1984 | Brorein | 350/96.23 |
| 4,715,677 A | 12/1987 | Saito et al. | |
| 4,729,628 A | 3/1988 | Kraft et al. | |
| 4,815,814 A | 3/1989 | Ulijasz | 350/96.23 |
| 4,836,640 A | 6/1989 | Gartside, III et al. | 350/96.23 |
| 5,082,719 A | 1/1992 | Arroyo | 428/219 |
| 5,109,457 A | 4/1992 | Panuska et al. | 385/102 |
| 5,155,304 A | 10/1992 | Gossett et al. | 174/117 |
| 5,188,883 A | 2/1993 | Rawlyk | 428/189 |
| 5,230,033 A | 7/1993 | Soodak | 385/105 |
| 5,267,339 A | 11/1993 | Yamauchi et al. | 385/123 |
| 5,371,825 A | 12/1994 | Traut | 385/109 |
| 5,448,670 A | 9/1995 | Blew et al. | 385/112 |
| 5,469,523 A | 11/1995 | Blew et al. | 385/101 |
| 5,651,081 A | 7/1997 | Blew et al. | 385/101 |
| 5,737,470 A | 4/1998 | Nagano et al. | 385/114 |
| 6,088,499 A | 7/2000 | Newton et al. | 385/112 |
| 6,101,305 A | 8/2000 | Wagman et al. | 385/113 |
| 6,160,939 A | 12/2000 | Sheu | 385/109 |
| 6,192,178 B1 | 2/2001 | Logan et al. | 385/109 |
| 6,249,628 B1 | 6/2001 | Rutterman et al. | 385/106 |
| 6,249,629 B1 | 6/2001 | Bringuier | 385/113 |
| 6,278,824 B1 | 8/2001 | Bosisio et al. | 385/100 |
| 6,424,771 B1 | 7/2002 | Sheu | 385/109 |
| 6,439,491 B1 | 8/2002 | Liao | 242/378.1 |
| 6,493,491 B1 | 12/2002 | Shen et al. | 385/113 |
| 6,501,888 B2 | 12/2002 | Gimblet et al. | 385/113 |
| 6,542,674 B1 | 4/2003 | Gimblet | 385/113 |
| 6,567,592 B1 | 5/2003 | Gimblet et al. | 385/113 |
| 6,714,710 B2 | 3/2004 | Gimblet | 385/113 |
| 6,728,455 B2 | 4/2004 | Kusakari et al. | 385/113 |
| 6,789,950 B1 | 9/2004 | Loder et al. | 385/53 |
| 6,827,884 B2 | 12/2004 | Marelli et al. | 264/1.28 |
| 6,909,821 B2 | 6/2005 | Ravasio et al. | 385/24 |
| 7,090,406 B2 | 8/2006 | Melton et al. | 385/62 |
| 7,090,407 B2 | 8/2006 | Melton et al. | 385/62 |
| 7,111,990 B2 | 9/2006 | Melton et al. | 385/53 |
| 7,113,679 B2 | 9/2006 | Melton et al. | 385/113 |
| 7,415,181 B2 | 8/2008 | Greenwood et al. | 385/100 |
| 7,539,380 B1 | 5/2009 | Abernathy et al. | 385/100 |
| 7,567,741 B2 | 7/2009 | Abernathy et al. | |
| 7,627,218 B2 | 12/2009 | Hurley | 385/101 |
| 7,796,853 B2 | 9/2010 | Abernathy et al. | |
| 8,023,787 B2 | 9/2011 | Katsuya et al. | 385/102 |
| 8,145,026 B2 | 3/2012 | Overton et al. | 385/128 |
| 8,538,216 B2 | 9/2013 | Abernathy et al. | 385/100 |
| 8,582,940 B2 | 11/2013 | Abernathy et al. | 385/100 |
| 8,712,200 B1 * | 4/2014 | Abernathy et al. | 385/100 |
| 2004/0114889 A1 | 6/2004 | Lee | |
| 2006/0140557 A1 | 6/2006 | Parris et al. | |
| 2006/0165355 A1 | 7/2006 | Greenwood et al. | 385/100 |
| 2006/0269198 A1 | 11/2006 | Blazer et al. | 385/100 |
| 2007/0031103 A1 | 2/2007 | Tinucci et al. | 385/139 |
| 2008/0175541 A1 | 7/2008 | Lu et al. | 385/62 |
| 2008/0175542 A1 | 7/2008 | Lu et al. | 385/62 |
| 2008/0175546 A1 | 7/2008 | Lu et al. | 385/92 |
| 2008/0253723 A1 | 10/2008 | Stokes et al. | 385/114 |
| 2015/0277075 A1 | 10/2015 | Abernathy et al. | |

FOREIGN PATENT DOCUMENTS

| | | | | |
|---|---|---|---|---|
| JP | 50-147745 A | 11/1975 | | G02B 5/14 |
| JP | 8-304675 A | 11/1996 | | G02B 6/44 |
| JP | 10-148739 | 6/1998 | | G02B 6/44 |
| JP | 2002-090596 A | 3/2002 | | G02B 6/44 |
| JP | 2002-090597 A | 3/2002 | | G02B 6/44 |
| JP | 2004-085741 A | 3/2004 | | G02B 6/44 |
| JP | 2005-148373 A | 6/2005 | | G02B 6/44 |
| JP | 2005-308916 A | 11/2005 | | G02B 6/44 |
| JP | 2008-129062 A | 6/2008 | | G02B 6/44 |
| WO | WO 2006/105034 A1 | 10/2006 | | G02B 6/38 |
| WO | WO 2008/027202 A2 | 3/2008 | | G02B 6/44 |
| WO | WO 2008/065928 A1 | 6/2008 | | G02B 6/44 |
| WO | 2009070200 A1 | 6/2009 | | |
| WO | 2010039530 A1 | 4/2010 | | |

OTHER PUBLICATIONS

European Patent Office, Communication, EP Application No. 09792893.1, Nov. 12, 2012—4 pages.
Optoelectronic Industry and Technology Development Association (Japan), Technical Paper, TP-BW01-2007, "Optical fiber distribution system for detached houses in FTTH," Jul. 2007—20 pages.
Fujikura Ltd., Product Spec Sheet, "DC-1/Drop Cable," 2003—1 page.
AU2009298873 Examination Report 1 Dated Jun. 25, 2014.
AU2009298873 Examination Report 2 Dated Jul. 31, 2015.
AU2010235982 Examination Report 1 Dated Dec. 5, 2014.
AU2010235990 Examination Report 1 Dated Sep. 19, 2014 (B Case).
AU2010235990 Examination Report 3 Dated Jul. 31, 2015.
CA2737934 Search Report Dated Oct. 20, 2015.
CN200980146741.8 Office Action Dated Feb. 24, 2014.

* cited by examiner

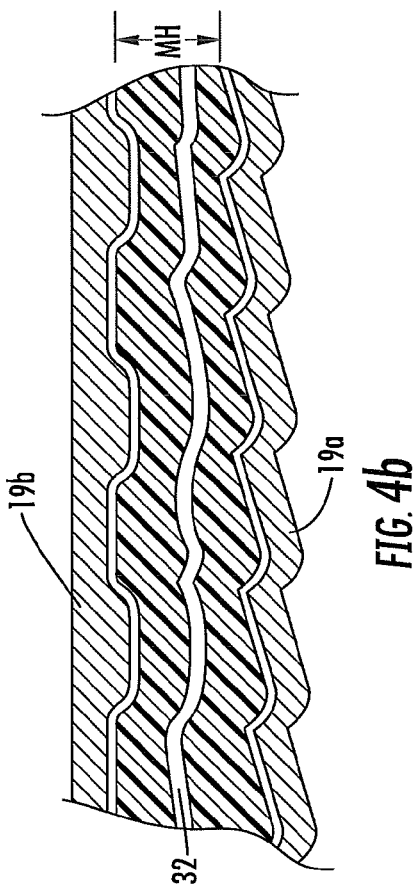
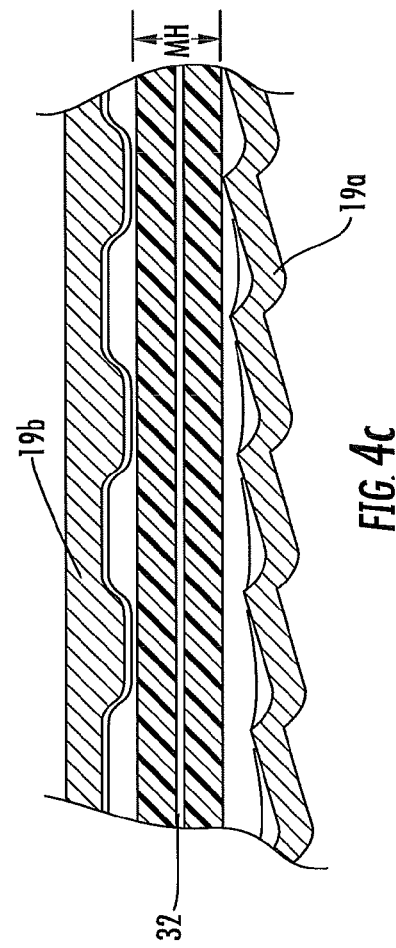
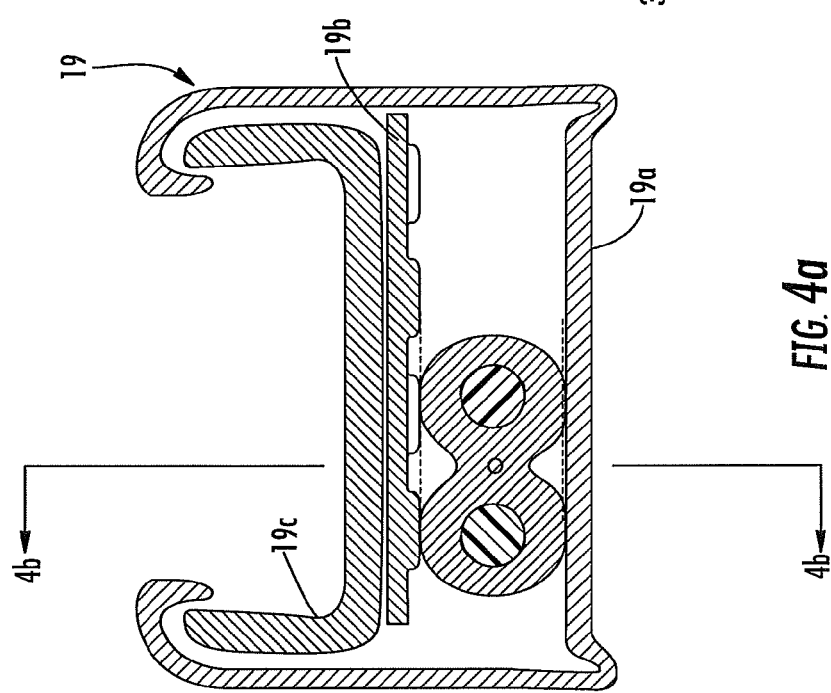
FIG. 4b
FIG. 4c
FIG. 4a

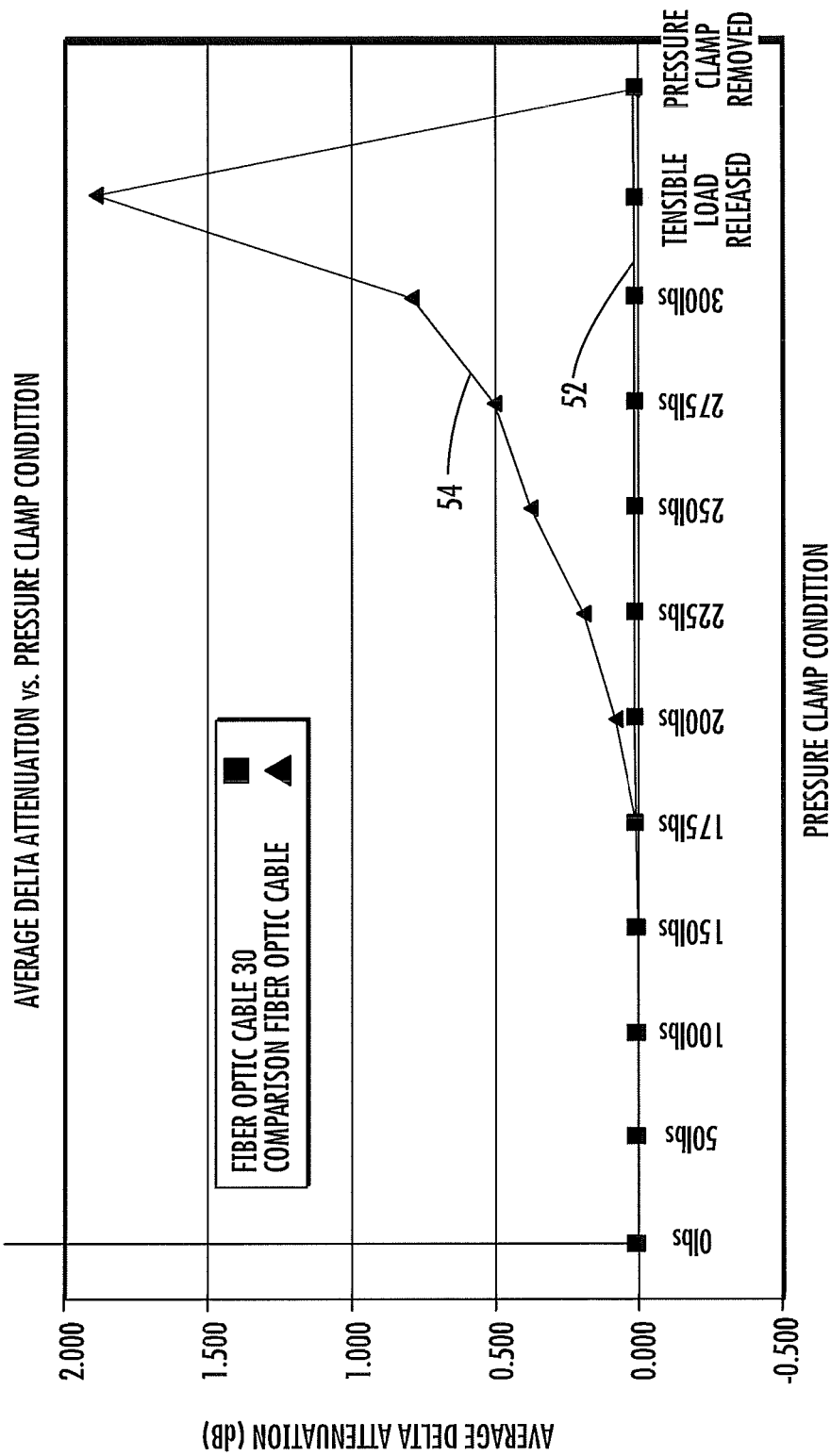

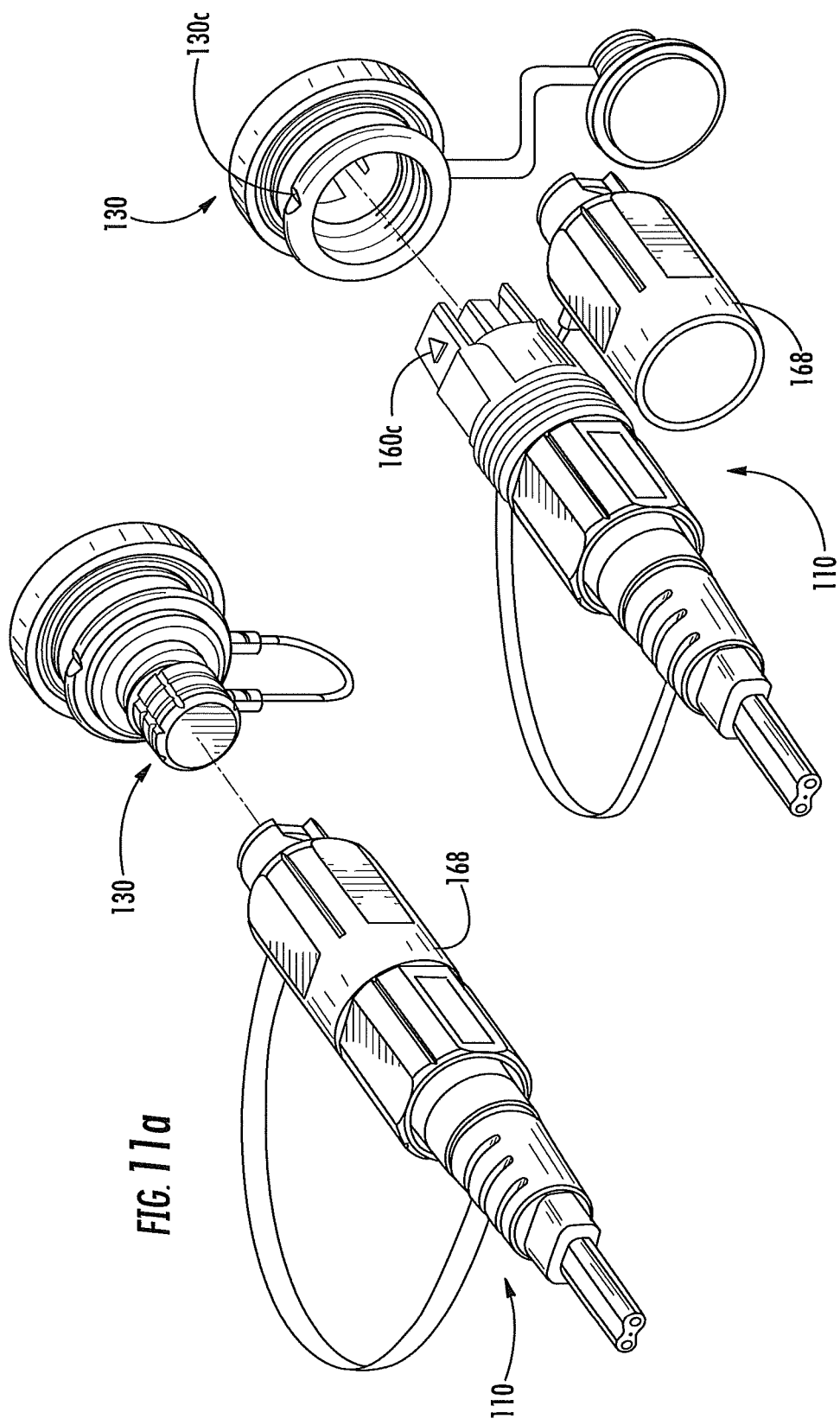

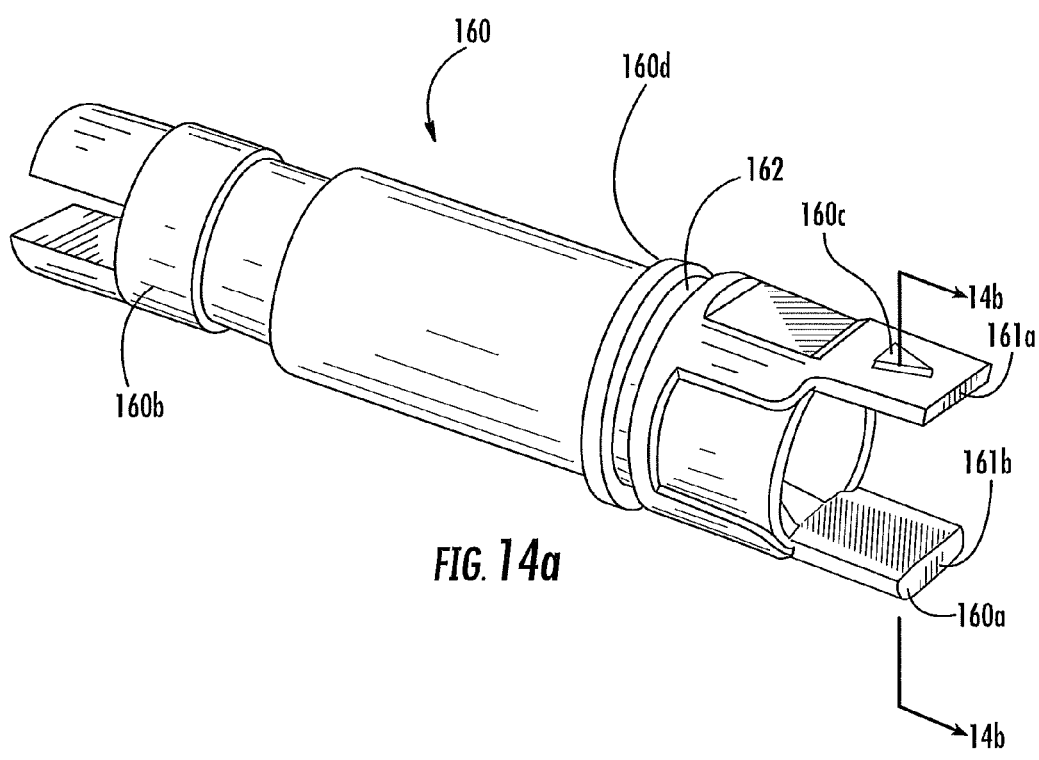
FIG. 14a
FIG. 14b

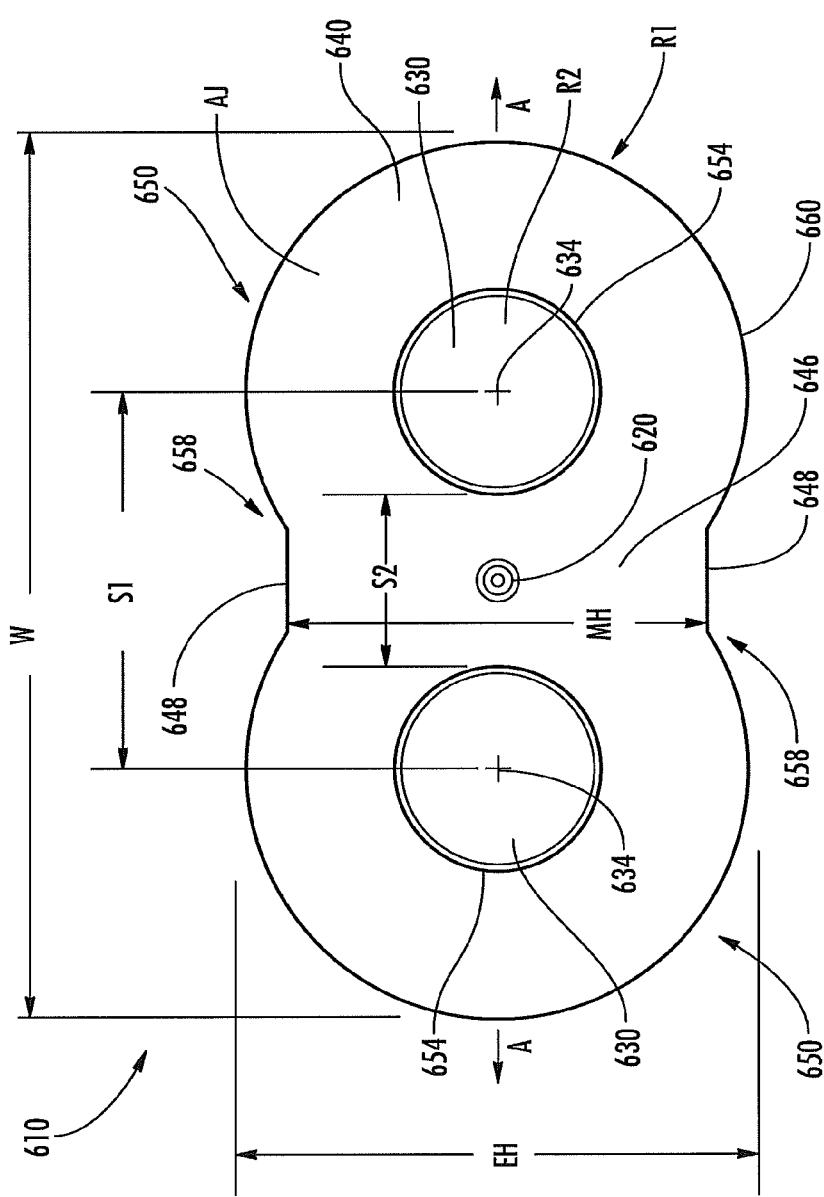

FIBER OPTIC CABLES AND ASSEMBLIES FOR FIBER TOWARD THE SUBSCRIBER APPLICATIONS

RELATED APPLICATIONS

This application is a continuation of U.S. application Ser. No. 13/950,718 filed Jul. 25, 2013, which is a continuation of U.S. application Ser. No. 13/051,760 filed Mar. 18, 2011, which issued as U.S. Pat. No. 8,538,216 and which is a continuation of International Application No. PCT/US2009/058017 filed Sep. 23, 2009, which claims the benefit of U.S. Provisional Application Nos. 61/192,925 and 61/163,948 filed Sep. 23, 2008 and Mar. 27, 2009, respectively, the entire contents of each of which is incorporated by reference herein.

Subject matter disclosed in this application may be related to subject matter disclosed in U.S. application Ser. No. 11/986,705, filed Nov. 26, 2007, now U.S. Pat. No. 7,539,380, U.S. application Ser. No. 12/258,121, filed Oct. 24, 2008, now U.S. Pat. No. 7,567,741, and U.S. application Ser. No. 12/419,425, filed Apr. 7, 2009, now U.S. Pat. No. 7,796,853.

TECHNICAL FIELD

The present application relates to fiber optic cables and assemblies suitable fiber optic networks such as fiber to the subscriber or fiber to the node applications. More particularly, the present application relates to fiber optic cables having a robust design, resistance to crush loads, small cross-sections, and large slack storage capacity for excess length.

BACKGROUND

Communications networks are used to convey a variety of signals such as voice, video, data and the like to subscribers. Service providers are now routing optical fiber deeper into communication networks to increase the bandwidth available to subscribers. Optical fiber to the premises, for example, provides much greater bandwidth than conventional copper cable.

FIG. 1 schematically illustrates two preconnectorized fiber optic cables 10 and 10' routed to the premises of a subscriber using two different installation techniques. FIG. 1 shows a first preconnectorized fiber optic cable 10 routed to premises 20 in an aerial installation, and a second preconnectorized fiber optic cable 10' routed to the premises 20 in a buried installation. In the aerial installation, a first end 10a of the preconnectorized cable 10 is attached at a first interface device 12 located at or near a pole 11, and a second end 10b of the preconnectorized cable 10 is attached at a second interface device 14 located at the premises 20. The first interface device 12 may be a closure, a multiport (a device having multiple receptacles), or the like. The second interface device 14 may be a closure, a network interface device (NID), an optical network terminal (ONT), or the like. In the aerial installation, the craft typically uses a pressure clamp 19 such as a p-clamp (shown schematically shown in FIG. 1) to secure the tensioned fiber optic cable 10 at the pole 11 and at the premises 20, which mitigates sag in the cable 10 along the aerial span.

FIG. 2 depicts a 2 PR pressure clamp 19 with a portion of fiber optic cable 10 held therein. The pressure clamp 19 is available from Reliable Power Products of Franklin Park, Ill. The pressure clamp 19 includes a body 19a, a grip 19b, and a wedge 19c that act to clamp the fiber optic cable 10 with increasing frictional force as the tension on the cable increases. The body 19a receives fiber optic cable 10 between the grip 19b and the wedge 19c and squeezes the cable therebetween as tensile forces are applied. The body 19a also has a loop end used for attaching it to structures such as the pole 11 or the premises 20.

The increasing frictional force on the fiber optic cable 10 prevents the fiber optic cable from pulling out of the pressure clamp 19. However, it is possible for the clamping force from the pressure clamp 19 to plastically deform or otherwise damage the fiber optic cable because the grip 19b has dimples and the body 19a has ridges. Conventional fiber optic cables used within pressure clamps may include buffer tubes to protect the fiber from such deformation.

In buried or duct applications, the first and second ends of preconnectorized cable 10' are respectively connected to an interface device 16 located at a field location 18 such as inside a pedestal, a manhole, a handhole or the like, and a second interface device 14. The interface devices may include a receptacle (not visible) for making the optical connection with a plug end of the preconnectorized fiber optic cable 10'. As in aerial applications, buried or duct applications may also require a rugged fiber optic cable design. For example, the fiber optic cable can encounter rough terrain or rough handling during installation, such as when pulling the cable into a duct. For fiber to the subscriber applications, the preconnectorized fiber optic cable should be robust enough to withstand aerial, buried, and/or duct installations while maintaining suitable optical performance and reliability.

Further, the distance between the pole 11 or the field location 18 to the second interface device 14 varies with each installation, while preselected lengths of preconnectorized fiber optic cable are typically used by the craft. The length of excess slack fiber optic cable length must therefore be stored. Large fiber optic cables may present problems due to the large space required for slack storage. One solution is to carry many different lengths of preconnectorized fiber optic cables into the field, which creates complexity issues for the craft, the service provider, and the manufacturer.

SUMMARY

According to one aspect of the present embodiments, a cable comprises at least one optical fiber; a first elongate strength component and a second elongate strength component, wherein the first strength component and the second strength component are disposed on opposite sides of the at least one optical fiber and generally aligned along a common plane; and a polymeric cable jacket, the cable jacket having a medial height disposed about the at least one optical fiber between the first and strength components, the medial height being less than an end height at the strength components, wherein the fiber optic cable has a cross-sectional area of less than 25 millimeters squared.

According to another aspect of the present embodiments, a ratio of the medial height to the end height is less than 0.95.

According to another aspect of the present embodiments, the cable is resistant to crush loads such as those created in a p-clamp. For example, when the cable is subjected to a crush load of 60 Newtons per millimeter, the fiber experiences a radial stress of less than 20 MPa.

According to another aspect of the present embodiments, the cable jacket can be extruded over the optical fiber without an intervening buffer tube. The fiber can be, for example, coated, tight-buffered, or non tight-buffered.

According to another aspect of the present embodiments, a method of making a fiber optic cable comprises paying off at least one optical fiber; paying off a first strength component; paying off a second strength component, wherein the first strength component and the second strength component are disposed on opposite sides of the at least one optical fiber; and extruding a cable jacket around the at least one optical fiber and the strength components, wherein the at least one optical fiber is tensioned at at least 100 gram-force as the cable jacket is extruded around the fiber so that a residual strain of 0.0-0.2% remains in the fiber.

According to the above and other aspects, fiber optic cables are rugged so that they can absorb radial compressions, such as when subject to compression in a p-clamp, yet have a small cross-section that is inexpensive to manufacture, and is convenient to store.

It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

FIGS. 4a-4c depict cross-sectional views of the fiber optic cables with different height ratios disposed within the pressure clamp of FIG. 2.

FIG. 5 is a graph depicting optical delta attenuation for the fiber optic cable of FIG. 3 along with a comparison fiber optic cable when disposed within the pressure clamp of FIG. 2 at various tensile loading conditions.

FIGS. 11a-11c show the fiber optic cable of FIG. 3 that was preconnectorized with an exemplary hardened connector according to the present invention in various stages of being plugged into a complementary receptacle.

FIG. 13 is a partially exploded view of the preconnectorized fiber optic cable of FIG. 11a.

FIGS. 14a and 14b respectively depict a perspective view and a sectional view of the shroud of the hardened connector of FIG. 13.

FIG. 20 is a cross-sectional view of a fiber optic cable according to an embodiment of the present invention.

DETAILED DESCRIPTION

Figure 1:
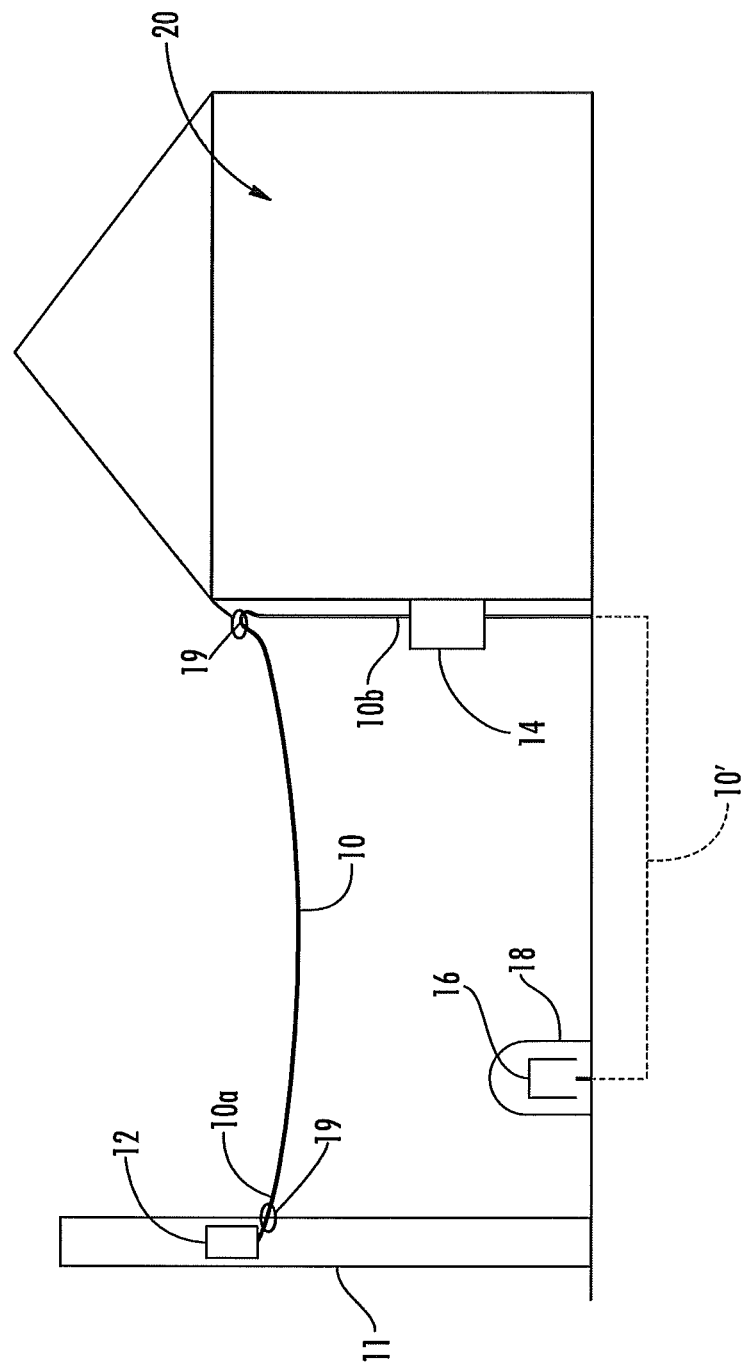
FIG. 1 schematically illustrates the drop link portion of an optical network routed to a premises using different installation techniques.
Figure 2:
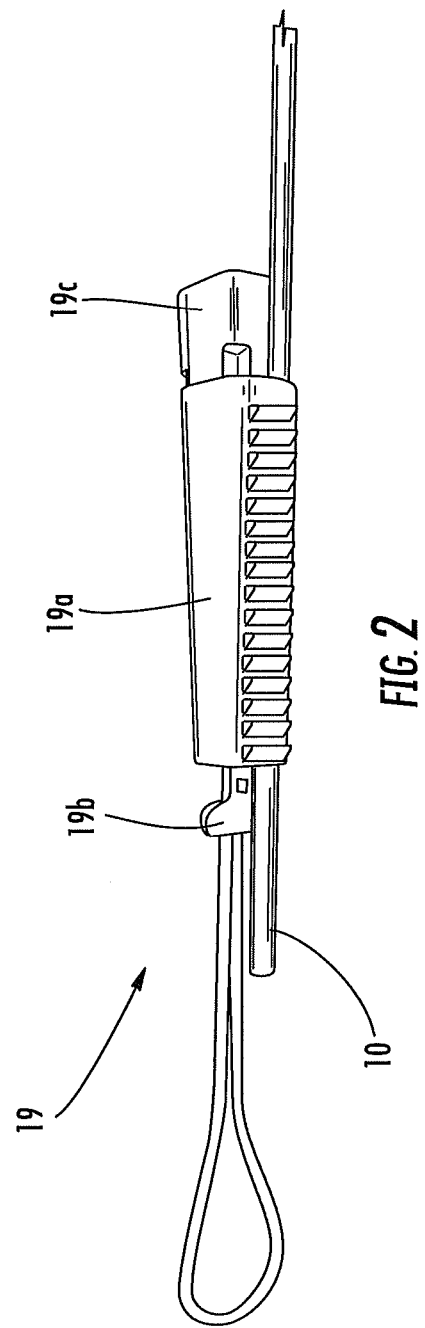
FIG. 2 is a perspective view of a portion of a fiber optic cable held within a typical pressure clamp used in aerial applications.

Reference will now be made in detail to the present embodiments, examples of which are illustrated in the accompanying drawings. When practical, the same or similar reference numerals are used throughout the drawings to refer to the same or like parts.

Figure 3:
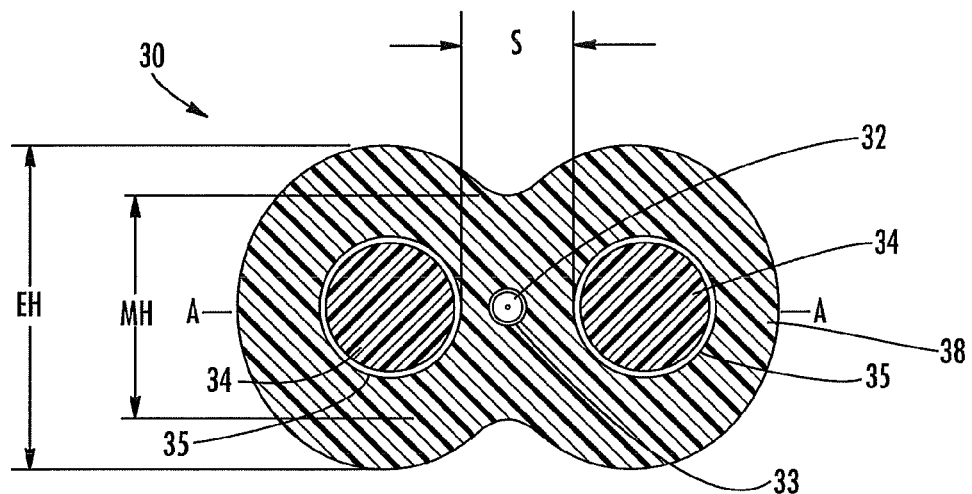
FIG. 3 is a cross-sectional view of a fiber optic cable according to an embodiment the present invention.

FIG. 3 is a cross-sectional view of a fiber optic cable 30 having at least one optical fiber 32, a first and a second strength component 34, and a cable jacket 38. The first and second strength components 34 are disposed on opposite sides of the optical fiber 32. The fiber 32 and the strength components 34 each have an axial centerline (not illustrated) that may be generally aligned along a common plane A-A. The orientation of the strength components 32, 34 on the common plane A-A in part provides preferential bend characteristics to the fiber optic cable 30.

In the exemplary embodiment shown in FIG. 3, the cable jacket 38 envelops and contacts the optical fiber 32 and also envelops and contacts both strength components 34. The cable jacket 38 has a medial height MH which is measured as a jacket thickness in the medial or center region of the cable cross-section, extending above and below the optical fiber 32, between the strength components 34. An end height EH of the cable jacket 38 is measured as the thickness of the jacket at each end of the cable cross-section, extending above and below each strength component 34. The end height EH can be equal to the total height of the cable 30, and may be aligned at the centerline of the strength components. According to the present embodiment, the medial height MH is less than the end height EH. This configuration preserves optical performance under crush loads such as during clamping within pressure clamp 19, as discussed in further detail below. The fiber optic cable 30 also has a relatively small cross-sectional footprint when compared with conventional fiber optic drop cables used for fiber to the subscriber, or node, applications. The small cross-sectional footprint provides a relatively large slack storage capacity for excess length, requires less material to manufacture, while still being robust.

Figure 4:
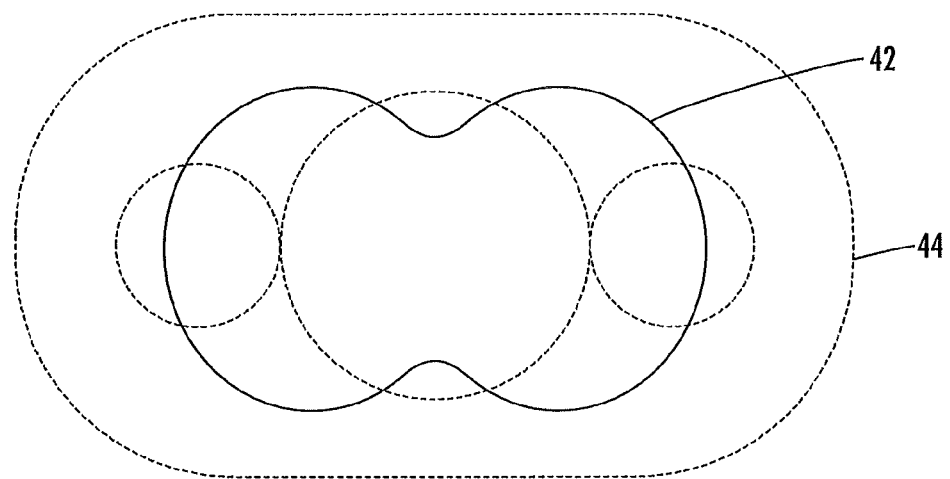
FIG. 4 depicts a cross-sectional area of the fiber optic cable of FIG. 3 superimposed on a conventional fiber optic drop cable.

For comparison purposes, FIG. 4 schematically illustrates a cross-sectional footprint 42 of the fiber optic cable 30 (represented by solid lines) superimposed onto a cross-sectional footprint 44 of a conventional fiber optic cable (represented by phantom lines with outlines of the buffer tube and strength members also shown) for fiber to the subscriber applications. As shown, the cross-sectional footprint 42 of the fiber optic cable 30 is substantially smaller than the cross-sectional footprint 44 of the conventional fiber optic cable while still providing a robust design for use within a 2 PR pressure clamp 19. In the illustrated example, the cross-sectional footprint 42 is about 42% of the cross-sectional footprint 44 (e.g., about 13.2 millimeters squared compared to about 31.5 millimeters squared) for a conventional cable. The configuration of the cable 30 allows the cross-sectional area of the cable 30 to be relatively small while still functioning under the stresses of the pressure clamp 19.

The cross-sectional footprint 42 is substantially smaller than the conventional cross-sectional footprint 44 in part because the cable 30 does not require a buffer tube (represented in FIG. 4 by the middle circle in phantom) as do conventional cables of this type. Buffer tubes are used in conventional cables for housing and protecting optical fibers from stresses such as may be created by a pressure clamp. According to the present embodiments, the fiber optic cable 30 does not require special installation procedures such as separation and/or isolation of the optical fiber from the clamping force of the pressure clamp 19, such as is required in conventional aerial applications. The fiber optic cable 30 can also withstand the requirements of buried and/or duct applications.

By way of example, the fiber optic cable 30 has a height MH of about 3.0 millimeters and a width W of about 5.3 millimeters. The concepts of the present invention may be used with fiber optic cables having other suitable dimensions and/or shapes as shown in Table 1 below. Moreover, the smaller cross-sectional footprint of fiber optic cable 30 allows for a smaller coil diameter compared with the conventional fiber optic cable. Consequently, relatively long lengths of the fiber optic cable 30 can be stored in a relatively small volume (i.e., space) such as at the network interface device at the subscriber's premise, closure, pedestal, or other suitable locations. The small size of the fiber optic cable 30 also allows for relatively large lengths of slack storage in small spaces for aerial installations and/or buried installations. The service provider and manufacturer can therefore stock fewer lengths of preconnectorized fiber optic cables such as a short length and a long length. Also, the craft can carry fewer lengths of preconnectorized assemblies into the field.

The fiber optic cable 30 also has a relatively low weight and small footprint for ice and wind loading such as under NESC heavy loading conditions. As such, lower tensile forces are required for maintaining suitable sag for fiber optic cable 30 in aerial installations, which results in lower tensile forces being applied to subscriber's premises from tension forces applied via the pressure clamp. For example, a 1% sag of fiber optic cable 30 in a 150 foot aerial span may be achieved with a tensile force of about 20 pounds. This tensile force is about 30% less than the tensile force in the conventional fiber optic drop cable shown by outline in FIG. 4. The relatively low tensile force also makes fiber optic cable 30 easier to install.

The first two rows of Table 1 compare various characteristics of the fiber optic cable 30 with the conventional fiber optic cable schematically illustrated in FIG. 4. The parameters include the overall dimensions, coiling capacity, and weight of the cables. Table 1 also tabulates data for size variations of fiber optic cable 30, which are listed as fiber optic cable 30' and as fiber optic cable 30". The conventional fiber optic cable indicated by the outline in FIG. 4 includes one or more optical fibers within a 3.0 millimeter buffer tube.

TABLE 1

Comparison of conventional cable with cable 30 and size variations thereof

| Cable | Overall width and height (mm) | Volume for coiling 60 meters of fiber optic cable ($cm^3$) | Weight of cable (kg/km) |
|---|---|---|---|
| Conventional cable | 8.1 × 4.4 | 8600 | 31 |
| Fiber optic cable 30 | 5.3 × 3.0 | 4300 | 15 |
| Fiber optic cable 30' | 5.9 × 3.25 | 4900 | 19 |
| Fiber optic cable 30" | 5.0 × 2.65 | 3760 | 13 |

The first two rows of Table 1 indicate that 60 meters of the fiber optic cable 30 can be coiled and stored in a space having a volume of about 4300 cubic centimeters or less, which is half of the space required for the same length of conventional fiber optic cable. Part of the reason for the difference in slack storage is that the cable 30 has a smaller bend radius and can be coiled into a smaller diameter than the conventional fiber optic cable. By way of example, a fiber optic cable as shown in FIG. 3 using 1.25 millimeter glass-reinforced plastic can begin being coiled with a diameter of about 12.5 centimeters or less, whereas the conventional fiber optic cable can begin being coiled with a diameter of about 16 centimeters. Another reason that the fiber optic cable 30 has a much greater slack storage characteristic is because the cross-sectional area of fiber optic cable 30 is much smaller—about 42% of the conventional fiber optic cable area as depicted in FIG. 4—than conventional cables.

The fiber optic cable 30 has a concomitant reduction in weight as compared with the conventional cable schematically illustrated in FIG. 4. For example, fiber optic cable 30 may have a weight of about 15 kilograms or less per kilometer of length compared with a weight of about 31 kilograms per kilometer of length for the conventional cable. The dramatic reduction in weight and increase in storage capacity is surprising for fiber optic cables that are capable of being GR-20, RDUP, IEC, and/or ICEA compliant. Thus, the slack storage and weight characteristics, along with the performance of the fiber optic cable 30 within pressure clamp 19 (as discussed below), provide the craft with a versatile fiber optic cable design for fiber optic networks.

As shown by Table 1 above, changes in size affect cable storage capacity and weight. The slight increase in size of the fiber optic cable 30' increases the storage volume for 60 meters of cable to about 4900 cubic centimeters or less and increases the weight of a kilometer of cable to about 19 kilograms or less. Likewise, a slight decrease in size, indicated by the cable 30" data, decreases the storage volume for 60 meters of cable to about 3760 cubic centimeters or less and decreases the weight per kilometer to about 13 kg/km or less. Additionally, fiber optic cables according to the present embodiments are useful for other applications in optical networks such as a tether cable that forms a portion of a distribution fiber optic cable assembly, as a jumper cable assembly, attached to a multiport device, or the like.

Generally speaking, the strength members 34 are much larger in cross-sectional size than the optical fiber 32 and are selected to provide the desired tensile strength requirements for the fiber optic cable 30. By way of example, the strength members described in this specification are elongate, rod-shaped dielectric members such as glass-reinforced plastic (GRPs) that extend along the length of the cable. The strength members may have a circular cross-section with a diameter of about 1.25 millimeters, but other sizes, shapes, and/or materials are possible. For example, the strength members can have an oval, rectangular, or other shape and/or can be formed from metals such as steel or copper and alloys thereof. If strength members are formed from steel, then the fiber optic cable is no longer a dielectric design, but the cable can be wrapped around structures for tie-down since the steel or metal strength members have a shape memory.

Figure 15A:
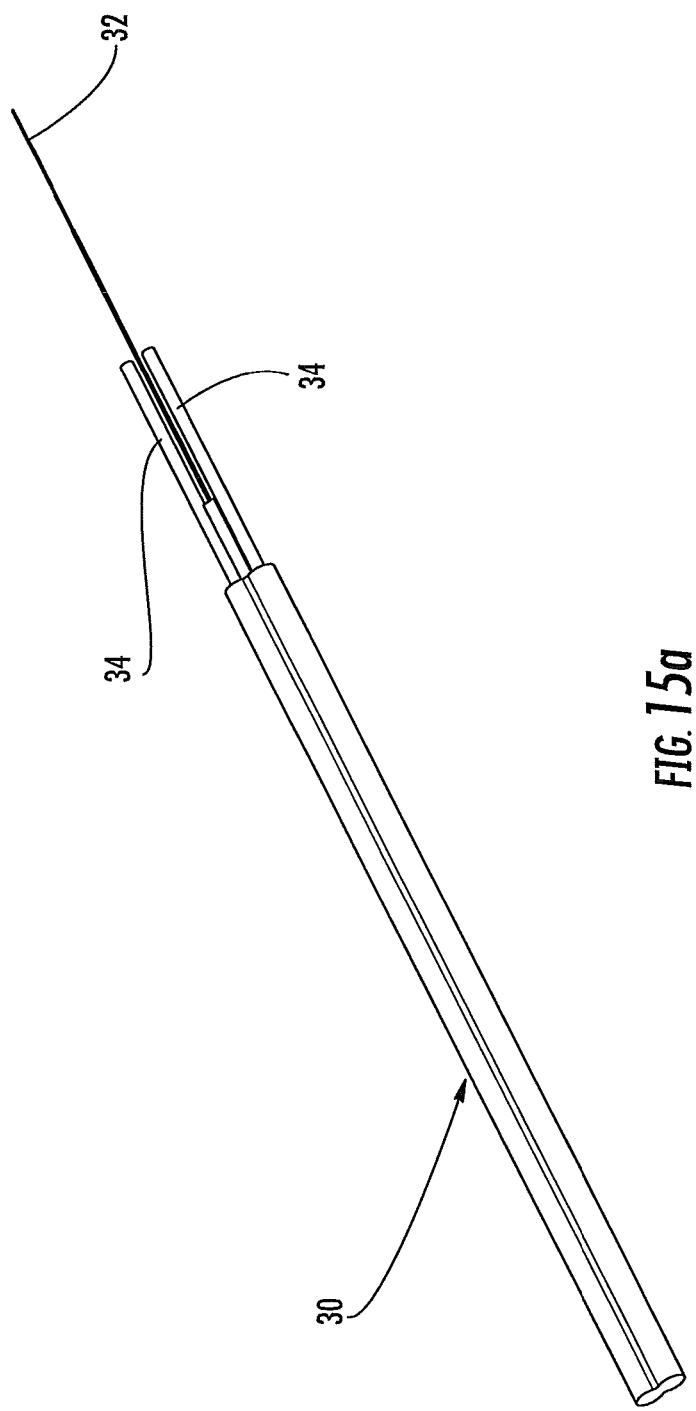
FIG. 15a is a perspective view of the fiber optic cable of FIG. 3 prepared for connectorization.

If the fiber optic cable 30 is intended for use with pressure clamps, then the strength members 34 should be suitably bonded with the cable jacket 38. Otherwise, the cable jacket 38 may be pulled from the strength members 34 by the pressure clamp 19, which can cause catastrophic failure. To promote bonding with the cable jacket 38, the strength members 34 may include one or more adhesion promoters 35 thereon. Adhesion promoters such as those selected from the ethylene-acrylic family (e.g., an ethylene-acrylic acid (EAA)) are suitable, but other materials or mechanisms can be used. For example, mechanical bonding can be achieved through the use of strength components with rough exterior surfaces or the like. Likewise, if the cable is intended for use with the pressure clamp 19, the strength members 34 should have a spacing S of at least about 1 millimeter apart between their inner surfaces to keep the clamped cable jacket 38 from moving into the optical fiber zone and pressing against optical fiber 32. This condition may cause elevated levels of optical attenuation. According to one embodiment, the spacing between inner surfaces of the strength members 34 is in the range of 0.8 millimeters to about 1.5 millimeters, thereby leaving a wall thickness of between about 0.4 to about 0.75 disposed about a single optical fiber when exposing and removing strength members 34 as shown in FIG. 15A. A relatively small spacing S also leads to larger storage capacity of the fiber optic cables according to the present embodiments.

As discussed above, the cable jacket 38 has a narrower medial or waist portion compared with the end portions of the fiber optic cable 30 (i.e., medial height MH is smaller than end heights EH). The shape of the cable jacket 38 is configured to inhibit and/or reduce bend losses of the optical fiber 32 due to crushing forces applied by pressure clamp 19. When tensioned within the pressure clamp 19, the end portions (i.e., end height EH) of the fiber optic cable 30 absorb the majority of the clamping forces and reduce the clamping force transferred to optical fiber 32. In one embodiment, the medial height MH is between about 0.1 to 1.0 millimeters smaller than end height EH, and in another embodiment, between about 0.2 and 0.8 millimeters smaller. A "height ratio" is defined as the ratio of the medial height to the end height (MH/EH). Fiber optic cables according to the present invention may have a height ratio in the range of about 0.6 to about 0.9 while still working within pressure clamp 19, but the closer the range is to 1.0 the more optical performance may be affected. According to one embodiment, the fiber optic cable 30 has a nominal height ratio of about 0.8 (2.5 mm/3.0 mm), but this value can vary within the range such as the height ratio being between about 0.6 (1.8 mm/3.0 mm) to about 0.9 (2.7 mm/3.0 mm).

The cable jacket 38 may be formed from any suitable polymer or blends such as, for example, a polyethylene, flame-retardant polyethylene, flame-retardant PVC, PVDF, and/or other suitable materials depending on intended use of the fiber optic cable (e.g., indoor, indoor/outdoor, or outdoor). Additionally, the optical fiber 32 may include an optional coating 33 that becomes part of the optical fiber to improve the handleability by the craft and/or its robustness. By way of example, the coating 33 can be any suitable material such as a UV-curable upcoating disposed on the optical fiber 32. The thickness can be in the range of, for example, about 500-900 microns. Polymer coatings such as a PVC, PVDF, or the like are also possible, but bonding between the polymer coating and cable jacket 38 should be avoided to inhibit optical attenuation.

FIGS. 4a-4b show various cross-sections of fiber optic cables within the pressure clamp 19 as the height ratio changes. FIG. 4a depicts a cross-sectional view of a fiber optic cable within a pressure clamp 19 with the wedge 19c clamping the cables between a grip 19b and a body 19a. In FIG. 4a, a cable of height ratio 0.6 is shown by a solid line and a profile for a cable of height ratio 1.0 is shown as dashed line at the medial height over optical fiber 32. A longitudinal section is taken along line 4b-4b respectively through medial height MH of the respective fiber optic cables with two different height ratios as shown respectively in FIGS. 4b and 4c. The wedge 19c is not shown in FIGS. 4b and 4c for clarity, but pushes down on grip 19b during clamping. As shown by the detail in FIGS. 4b and 4c, the grip 19b has dimples (not numbered) and the clamp body 19a has ridges (not numbered) for deforming fiber optic cable to increase the gripping force on the cable. Specifically, FIG. 4b shows the longitudinal section of a fiber optic cable with a height ratio of 1.0 and the deformation of the cable jacket 48 created by the dimples of grip 19b and the ridges on body 19a. FIG. 4b also shows that deformation of the cable caused by the pressure clamp 19 affects optical fiber 32, which in turn affects optical performance.

As shown in FIG. 4c the fiber optic cable of height ratio 0.6 shows little or no deformation at the medial point of the cable. Instead, the gripping force from the dimples of grip 19b and the ridges on body 19a occurs mainly in the end portions of the cable. The lack of deformation of the cable jacket 48 over the optical fiber 32 preserves the optical performance of the fiber. According to the present embodiments, height ratios of about 0.9 or less result in lesser deformation of the cable jacket 38 into the region housing the optical fiber 32 when the cable is held within the pressure clamp 19. According to another aspect of the present embodiments, height ratios of 0.75 or less can be used.

FIG. 5 is a plot of average delta optical attenuation under varying pressure clamp conditions for the fiber optic cable 30 (illustrated in FIG. 3) and a comparison fiber optic cable. The reference wavelength is 1625 nanometers for comparison purposes. The height ratio for the fiber optic cable 30 is about 0.8 and the height ratio of the comparison cable is 1.0. The plot depicts the average delta optical attenuation for the fiber optic cables held within the pressure clamp 19. The plot shows optical attenuation as the tensile load on the fiber optic cables increases from 0 pounds to 300 pounds, after the tensile load is released from the respective fiber optic cables with the pressure clamp 19 still attached, and finally, when the pressure clamp 19 is removed from the respective fiber optic cables. The 300 pound tensile load simulates extreme aerial installations using the pressure clamp 19 along with heavy wind and ice loading. The line 52 represents the average delta optical attenuation for the fiber optic cable 30 and the line 54 represents the average delta optical attenuation for the comparison fiber optic cable over the given tensile range and other conditions. The line 52 is generally flat at around 0.02 dB, which may be considered to be within the noise level of the attenuation measuring device. The line 52 is therefore shown as being approximately zero across the tensile range and other conditions. By contrast, the line 54 has a relatively low delta optical attenuation until the tensile force reaches about 175 pounds and then dramatically increases to unacceptable levels as the tensile force increases past 175 pounds. After the tensile force of 300 pounds is released, the attenuation still increases as the pressure clamp remains clamped and the cable jacket material relaxes within the pressure clamp 19.

As discussed above, the strength components 34 of the fiber optic cable 30 (FIG. 3) can be bonded to the cable jacket 38, which can prevent breakage of the optical fiber as the tensile forces increase to large loads in the area of 300 pounds. If the strength members 34 are not bonded to the jacket, the pressure clamp 19 may cause the cable jacket 38 to plastically deform by necking down on one side of the pressure clamp 19 and accordion on the other side. Accordingly, in this specification, when it is said that the strength members 34 are in direct contact with the cable jacket 38 it is understood that adhesion promoters may be present at the bond point of cable to jacket.

According to the present embodiments, the exemplary fiber optic cable 30 is constructed so that it is robust enough to withstand extreme installation tensile loads and long spans under heavy wind/ice loads that can be experienced in aerial installations using pressure clamp 19, without undue levels of optical attenuation or catastrophic failure. By way of example, in an aerial span of 150 feet, the fiber optic cable 30 experiences a tensile load of about 220 pounds under NESC heavy loading (i.e., wind and ice). The relatively low tensile load under NESC heavy conditions is facilitated by its relatively small cross-sectional footprint of fiber optic cable 30. Further, as shown by FIG. 5, the fiber optic cable 30 can withstand extreme tensile loading beyond NESC heavy loading while disposed within pressure clamp 19 (e.g., such as up to 300 pounds) without experiencing excessive levels of optical attenuation.

According to another aspect of the present invention, because the cable jacket 38 contacts optical fiber 32, a water-swellable or water-blocking component is not necessary since there are no gaps (i.e., pathways) for water to migrate along the interior of the fiber optic cable 30. The cable jacket 38 may be tightly drawn onto optical fiber 32 without bonding to the fiber. It is believed that bonding of the cable jacket 38 with the optical fiber 32 is inhibited due to the relatively small amount of polymer required to form the cable jacket 38 cross-section. The small volume of polymer, which has relatively low thermal energy, cools quickly during manufacturing so that there is insufficient time for thorough bonding. An exemplary method of forming optical cables according to the present embodiments is discussed below with reference to FIG. 25.

According to yet another aspect of the present embodiments, the cross-section of the fiber optic cable 30 is relatively small because a buffer tube is not required for protecting the optical fiber (i.e., no buffer tube is necessary for inhibiting crushing forces and/or inhibiting sticking of the optical fiber to the cable jacket). The relatively small amount of polymer for cable jacket 38 can be quantified using a cable jacket envelope to strength component area ratio. The cable jacket envelope to strength component area ratio is defined as the total area of the cable jacket envelope (minus the area of the strength component(s)) to the total area for all of the strength components. For instance, the cable jacket envelope to strength component area ratio of the fiber optic cable 30 shown in FIG. 3 is about 4.5:1, whereas the ratio for the conventional fiber optic cable of FIG. 4 is about 5.5:1. Size variations of fiber optic cable 30 can alter the ratio to about 5:1 or less.

The optical fiber 32 can be constructed to provide desired performance for various intended applications. For instance, if the cable 32 is intended for aerial applications, then the optical fiber 32 within fiber optic cable 30 can be constructed to have an average delta optical attenuation of about 0.3 dB or less when disposed in pressure clamp 19 with a tensile load of 300 pounds. According to another embodiment, the delta optical attenuation under these conditions can be about 0.1 dB or less, as exemplified by FIG. 5. Likewise, if the fiber optic cable has strength components with shape memory and is intended to be wrapped about structures for tie-down, then the optical fiber 32 should be a bend resistant optical fiber to accommodate small bend diameters as known in the art. Optical fiber 32 has a relatively low excess fiber length (EFL) such as 0.1% or less since cable jacket 38 contacts the same and higher levels of EFL can cause elevated optical attenuation levels. Additionally, optical fiber 32 may be proof-tested to higher strength levels than normal (e.g., over 100 KPSI) such as proof tested to 200 KPSI or other suitable value for making the fiber optic cable compliant with GR-20 optical fiber strain requirements.

Figure 6:
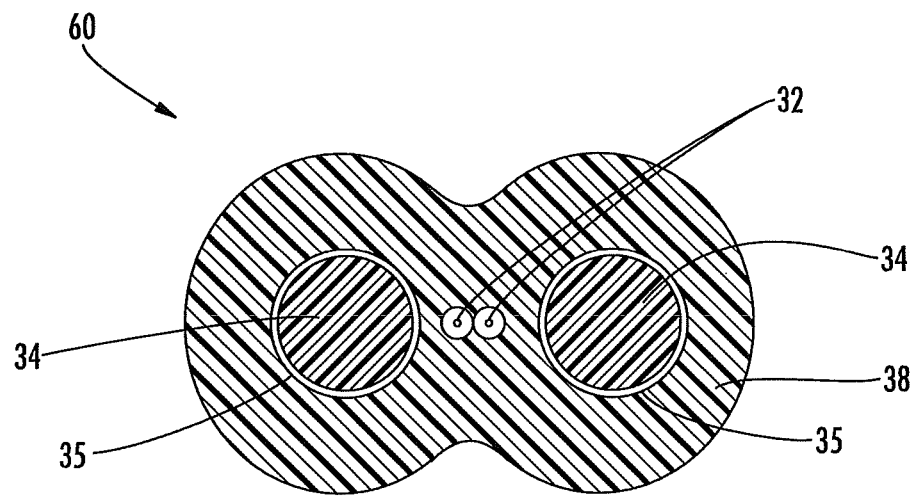
FIGS. 6 and 7 are cross-sectional views of fiber optic cables having multiple optical fibers according to embodiments of the present invention.
Figure 7:
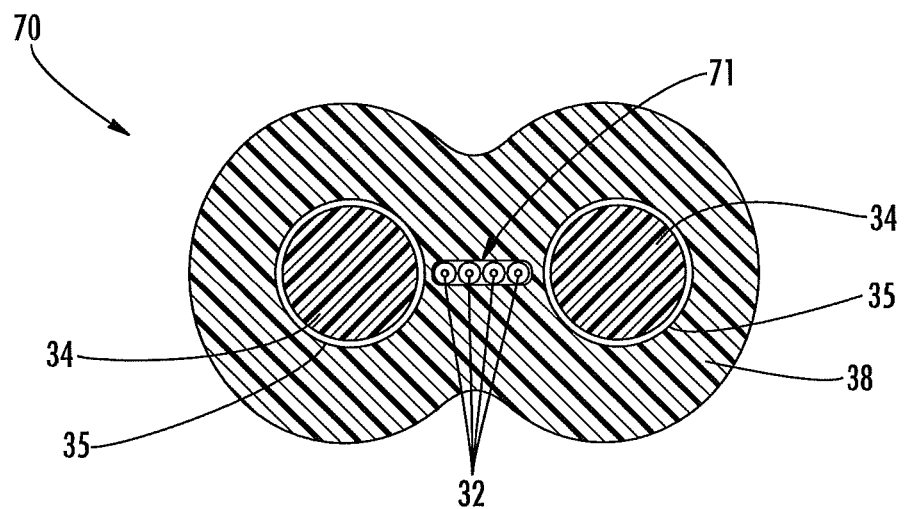

Fiber optic cable designs according to the concepts of the present invention can have any suitable number of optical fibers therein in a bare, colored, coated, and/or ribbonized format. FIG. 6 illustrates cross-section of a fiber optic cable 60 of similar geometry and composition to the cable 30 shown in FIG. 3, except that two bare optical fibers 32 are disposed in the medial region of the cable, between the strength members 34 and generally coplanar with the axial centerlines of the strength members. FIG. 7 illustrates cross-section of a fiber optic cable 70 of similar geometry and composition to the cable 30 with a fiber ribbon 71 of four optical fibers 32 disposed between the strength members 34 and generally coplanar with the axial centerlines of the strength members.

Figure 8:
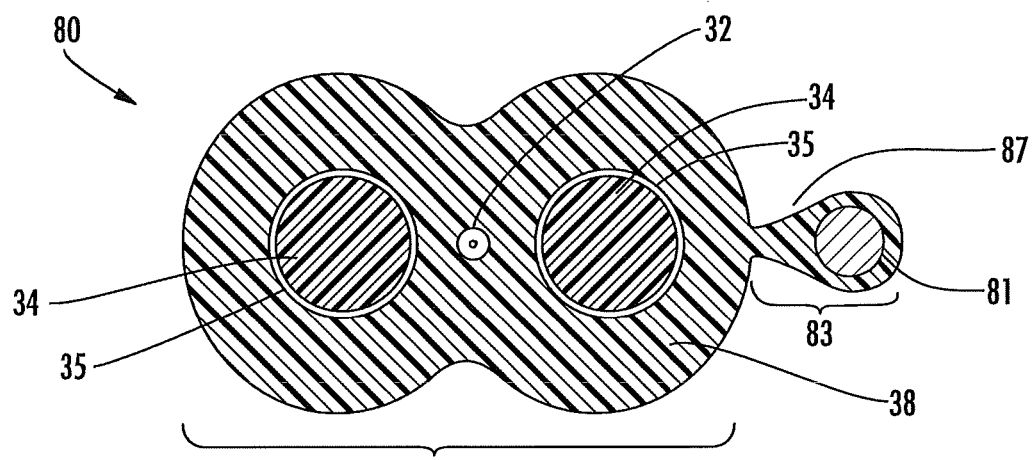
FIGS. 8-10 depict cross-sectional views of fiber optic cables similar to the fiber optic cable 30 having a toneable element according to the present invention.
Figure 9:
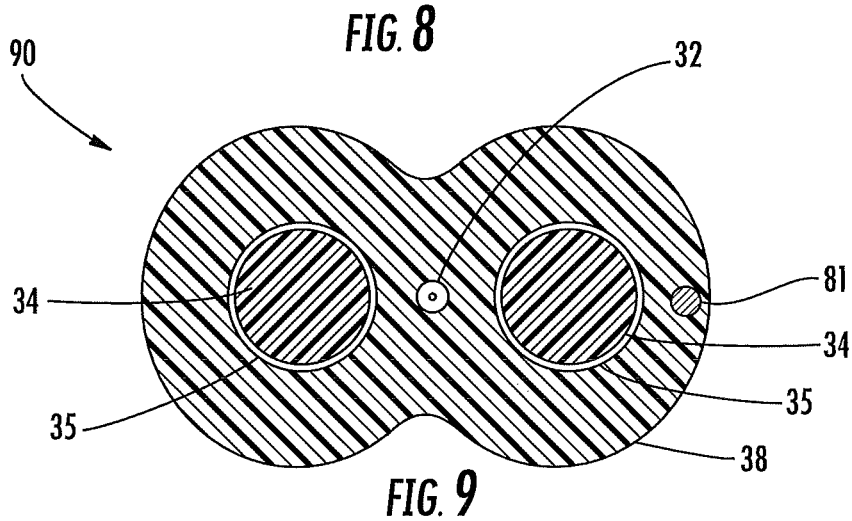
Figure 10:
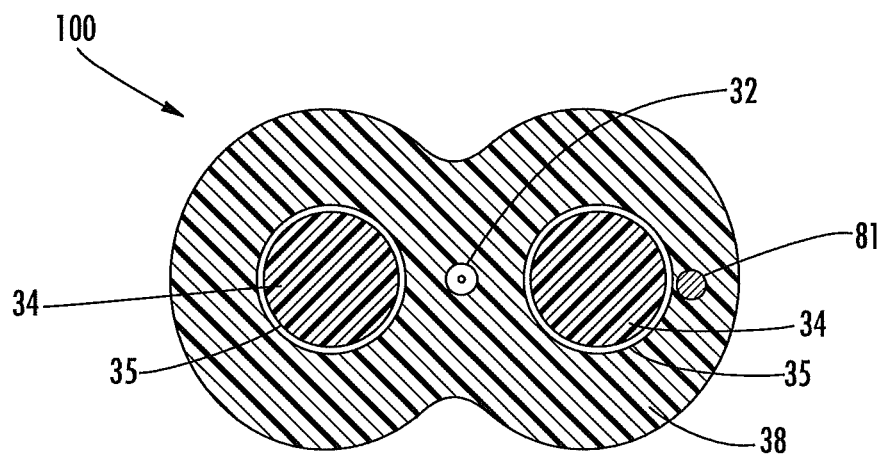

FIGS. 8-10 illustrate cable cross-sections of similar composition and geometry to the cable 30 with toneable elements 81 included therein. The toneable elements 81 can be included for locating the fiber optic cable such as when it is buried. The toneable element 81 may be any suitable conductive material useful for determining the location of the fiber optic cable, such as a small conductive copper wire, copper-clad steel, a printed conductive strip, or the like. By way of example, the illustrated toneable elements 81 are copper wires having a gauge between 20-42 AWG. Referring to FIG. 8, the fiber optic cable 80 has a toneable element 81 disposed within a toneable lobe 83 that is separable from a main cable body 85. The toneable lobe 83 is attached to main cable body 85 by a breachable web 87 that is easily separable by hand, thereby making it craft-friendly. The web 87 can also include a preferential tear portion/geometry (not numbered) for controlling the location of the tear in the web near main cable body 85, thereby resulting in a "clean" separation. The main cable body 85 and the toneable lobe 83 are typically extruded through the same extrusion tooling.

Referring to FIG. 9, the fiber optic cable 90 includes a toneable element 81 disposed within the cable jacket 38, in the main cable body, at a location near the outer surface of the jacket for ease of access to the toneable element 81. The fiber optic cable 100 is another variation where the toneable element 81 is disposed within cable jacket 38, but disposed adjacent to one of the strength members 34. Fiber optic cables 90 and 100 may also include marking indicia for indicating which side of the cable includes the toneable element 81. In other variations, the toneable element 81 can be disposed within one of the strength members or a strength component could also be a toneable element.

As discussed in further detail below, fiber optic cables according to the present embodiments can be preconnectorized in the field or the factory on one or more ends with a hardened optic connector, thereby making a preconnectorized fiber optic cable or assembly suitable for plug and play connectivity by the craft. As used herein, a "hardened connector" refers to a robust fiber optic connector that is weatherproof, thereby making it suitable for use in the outside plant environment, but it is possible to use the hardened connector indoors. For instance, the craft may route the preconnectorized fiber optic cable having the hardened connector to a premises, a multi-port device, a network interface device (NID), an optical network terminal (ONT), a closure, or the like.

Figure 11C:
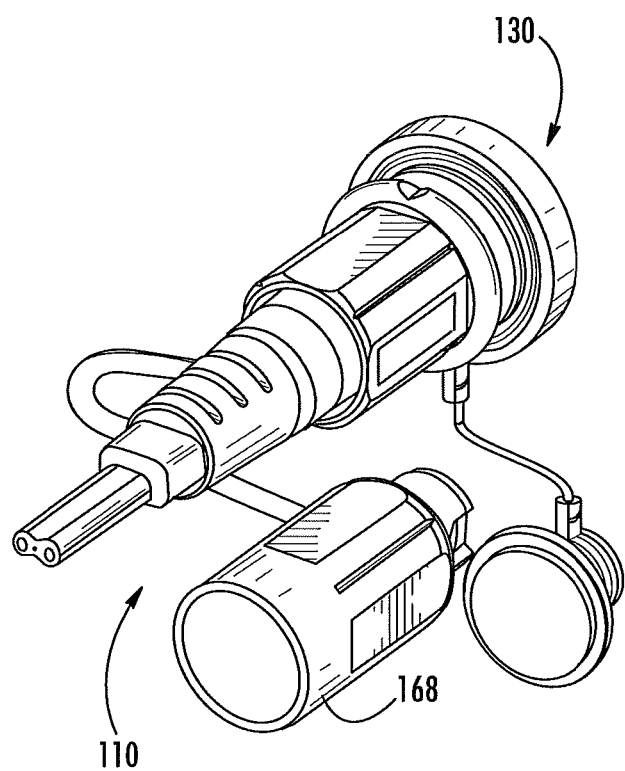

FIGS. 11*a*-11*c* illustrate an exemplary fiber optic mating assembly during the various stages of mating of an end of a preconnectorized fiber optic cable.

In FIGS. 11*a*-11*c*, a preconnectorized fiber optic cable 110 (i.e., the assembly includes fiber optic cable 30 with one or more hardened connectors 150) is being mated with a complementary receptacle 130. FIG. 11*a* shows the receptacle 130 detached from the preconnectorized fiber optic cable 110. Moreover, the preconnectorized fiber optic cable 110 and receptacle 130 are depicted with their respective protective caps on. The protective cap 168 is used for shielding a connector assembly 152 (FIG. 13), and in particular, the end face of a connector ferrule 152*b* of the hardened connector from the elements and/or from damage. The installed protective cap 168 isolates connector ferrule 152*b* from the elements and prevents it from being damaged during transportation and handling. FIG. 11*b* shows the protective cap 168 removed from the end of preconnectorized fiber optic cable 110. The respective cap (not numbered) of the receptacle 130 is also removed. The preconnectorized fiber optic cable 110 is positioned to engage the complimentary portions of the receptacle 130. Specifically, an alignment indicium 160*c* of the preconnectorized fiber optic cable 110 is positioned to its complementary indicium 130*c* of receptacle 130. FIG. 11*c* shows a mated connection between the preconnectorized fiber optic cable 110 and the receptacle 130, thereby establishing an optical connection there between. As is readily apparent from the figures, no special equipment, training, or skill is required to establish the optical connection. Thus, the labor cost of deploying the optical network to the premises, or other location, is low and the process is efficient. In the illustrated application, the mating between the hardened connector (i.e., the plug connector) and the receptacle is secured using a threaded engagement, but other suitable means of securing the optical connection are possible. For instance, the securing means may use a quarter-turn lock, a quick release, a push-pull latch, or a bayonet configuration.

Figure 12:
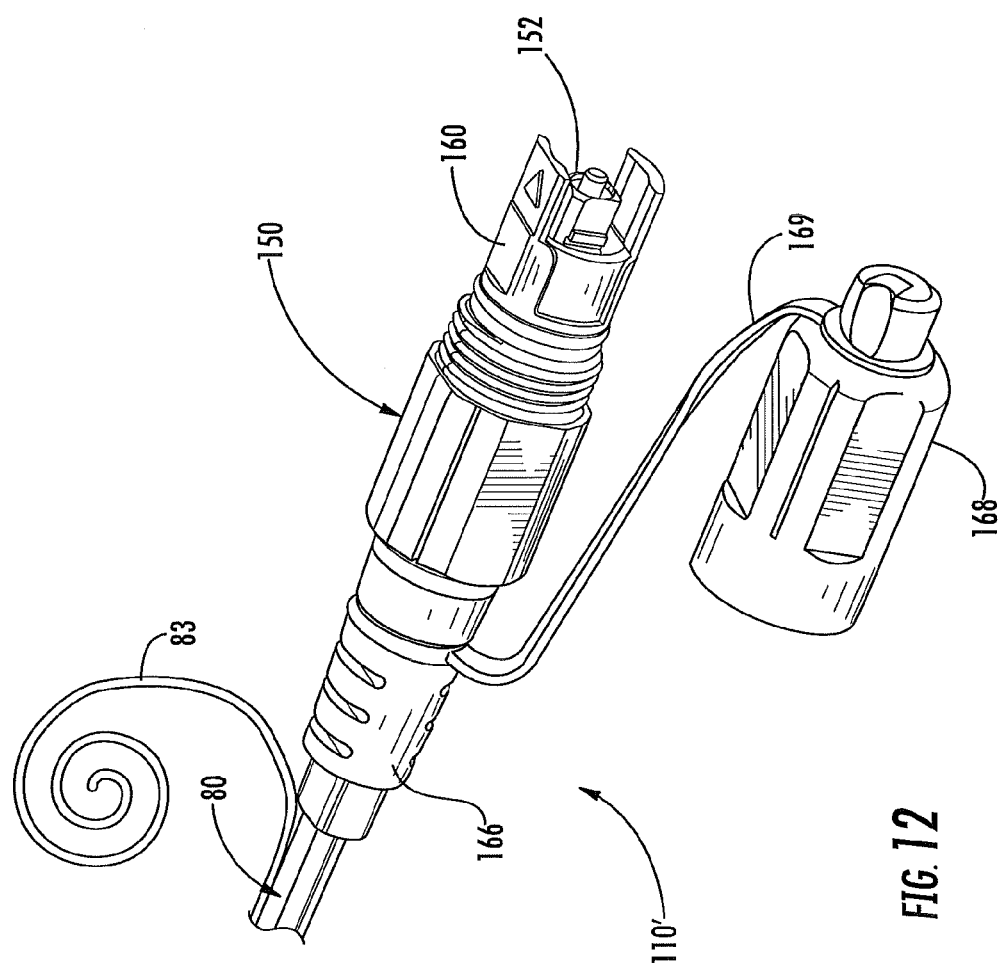
FIG. 12 is an assembled perspective view of a preconnectorized fiber optic cable using the fiber optic cable of FIG. 8.

FIG. 12 is a perspective view of an assembled preconnectorized fiber optic cable 110' with a toning element 81. The preconnectorized fiber optic cable 110' is an assembly that includes fiber optic cable 80 with a hardened connector 150 (e.g., optical plug connector) mounted on one end of fiber optic cable 80. Recall that the fiber optic cable 80 has a toning element 81 disposed within a toneable lobe 83 that is connected by a web portion 87 to the main cable body 85. As shown, a portion of toneable lobe 83 is separated from main cable body 85 and coiled before attaching the hardened connector 150, thereby keeping it out of way and allowing grounding of toneable element 81 if necessary. The hardened connector 150 uses a connector assembly 152 of the SC type, but other types of connector assemblies such as LC, FC, ST, MT, and MT-RJ are contemplated by the present invention by using a suitable crimp housing. Thus, suitable hardened connectors may be used with suitable cables according to the concepts of the present invention, thereby resulting in numerous fiber optic cable/hardened connector assembly combinations.

Figure 13:
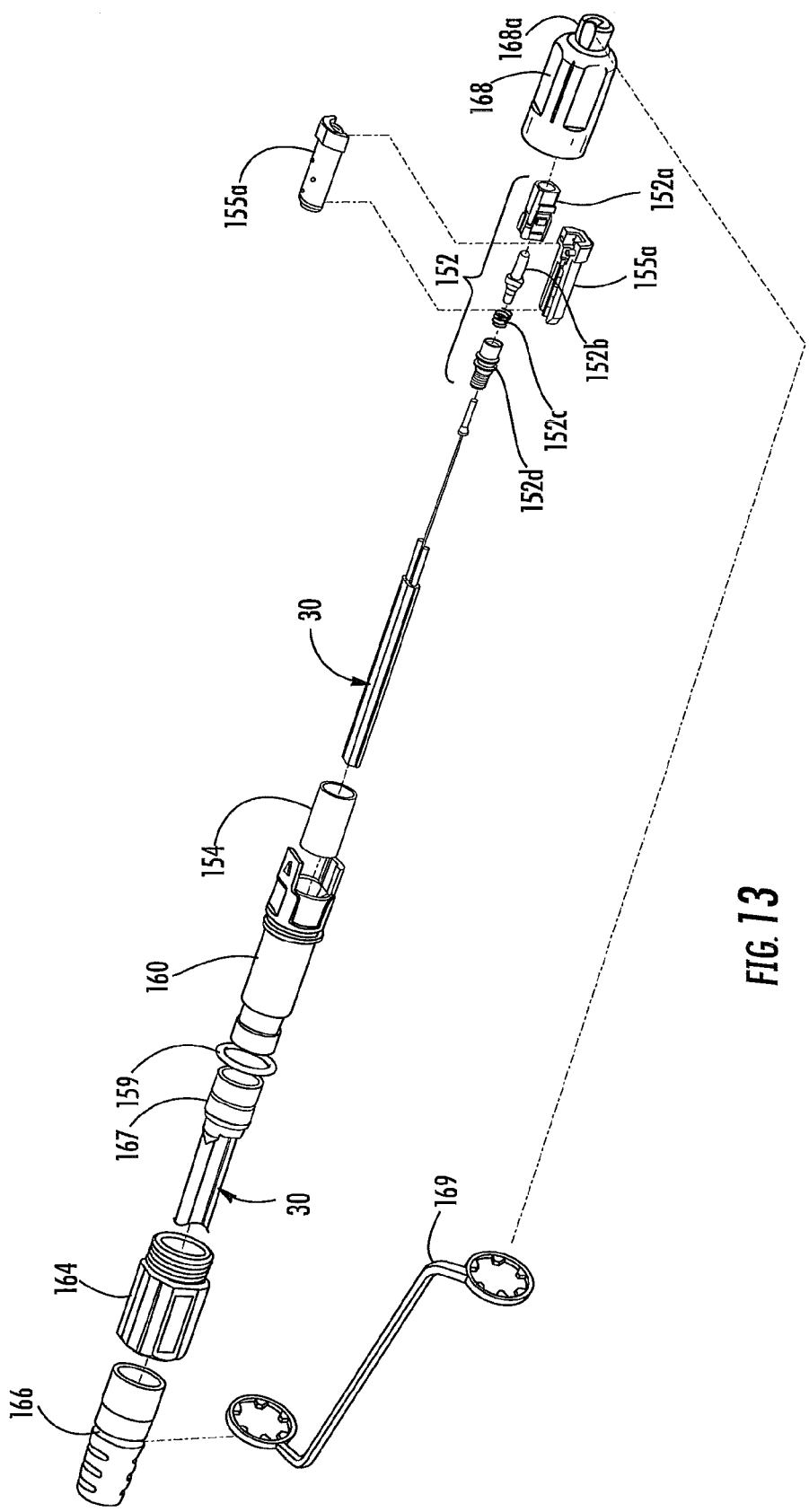

FIG. 13 is a partially exploded view of the preconnectorized fiber optic cable 110 showing the components of the hardened connector 150. As shown, the hardened connector 150 includes an industry standard SC type connector assembly 152 having a connector body 152*a*, a ferrule 152*b* in a ferrule holder (not numbered), a spring 152*c*, and a spring push 152*d*. The hardened connector 150 also includes a crimp assembly (not numbered) that includes a crimp housing 155 having at least one shell 155*a* and a crimp band 154, a shroud 160 (FIGS. 14*a* and 14*b*) that receives one or more O-rings 159, a coupling nut 164, a cable boot 166, a heat shrink tube 167, and protective cap 168 secured to boot 166 or other suitable portion of the assembly by a lanyard 169.

Generally speaking, most of the components of the hardened connector 150 are formed from a suitable polymer. By way of example, the polymer in the illustrated embodiment is a UV stabilized polymer such as ULTEM 2210 available from GE Plastics; however, other suitable materials are possible. For example, stainless steel or any other suitable metal may be used for various components.

Figure 15B:
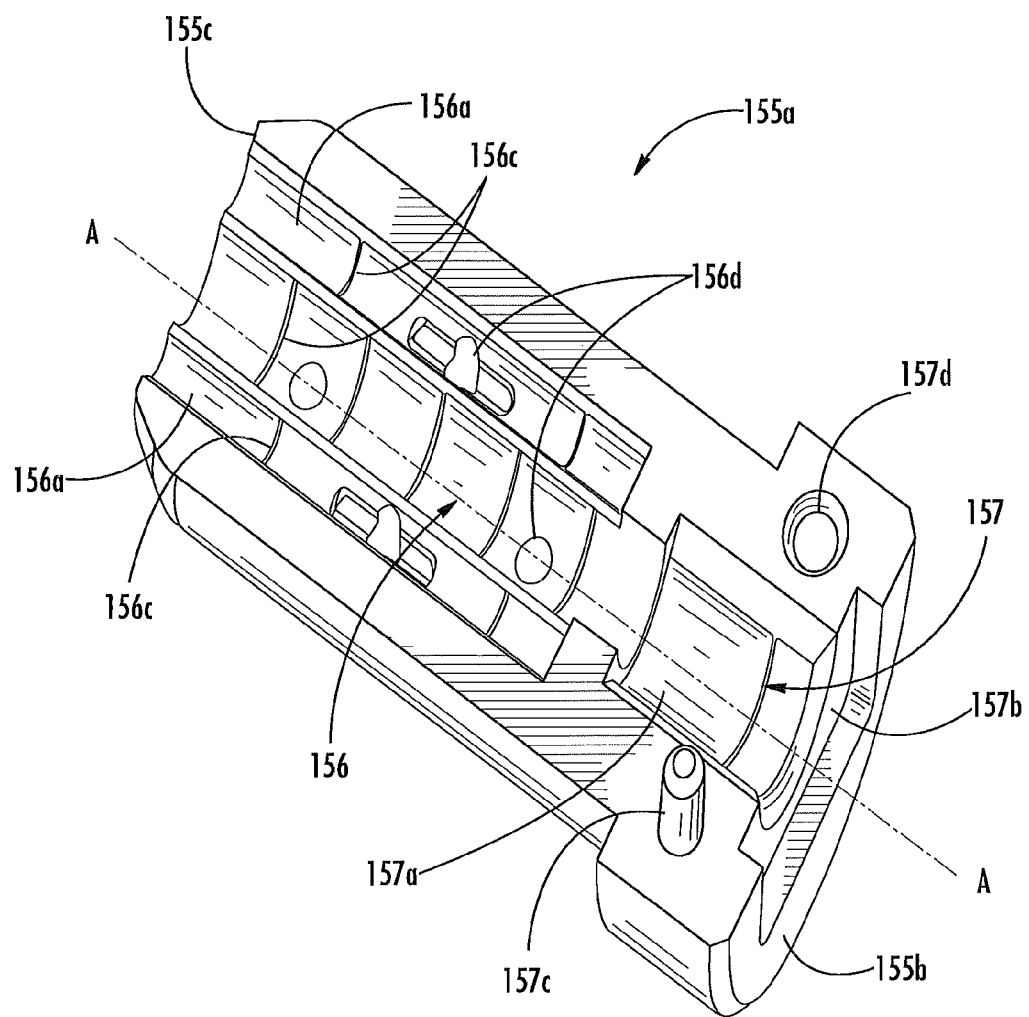
FIG. 15b is a perspective view of one shell of the crimp housing of the hardened connector of FIG. 13.
Figure 15C:
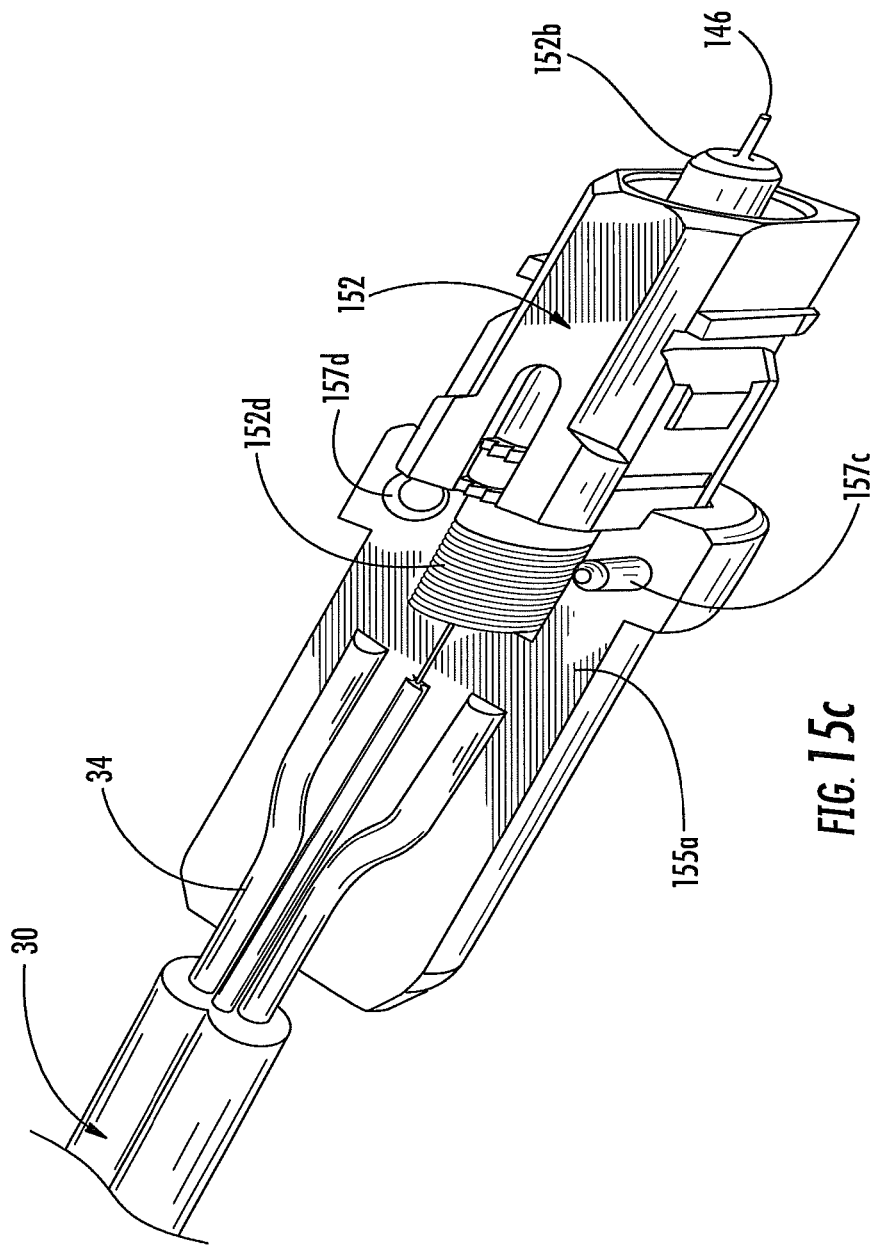
FIG. 15c shows a partially assembled view of the preconnectorized fiber optic cable of FIG. 13.
Figure 15D:
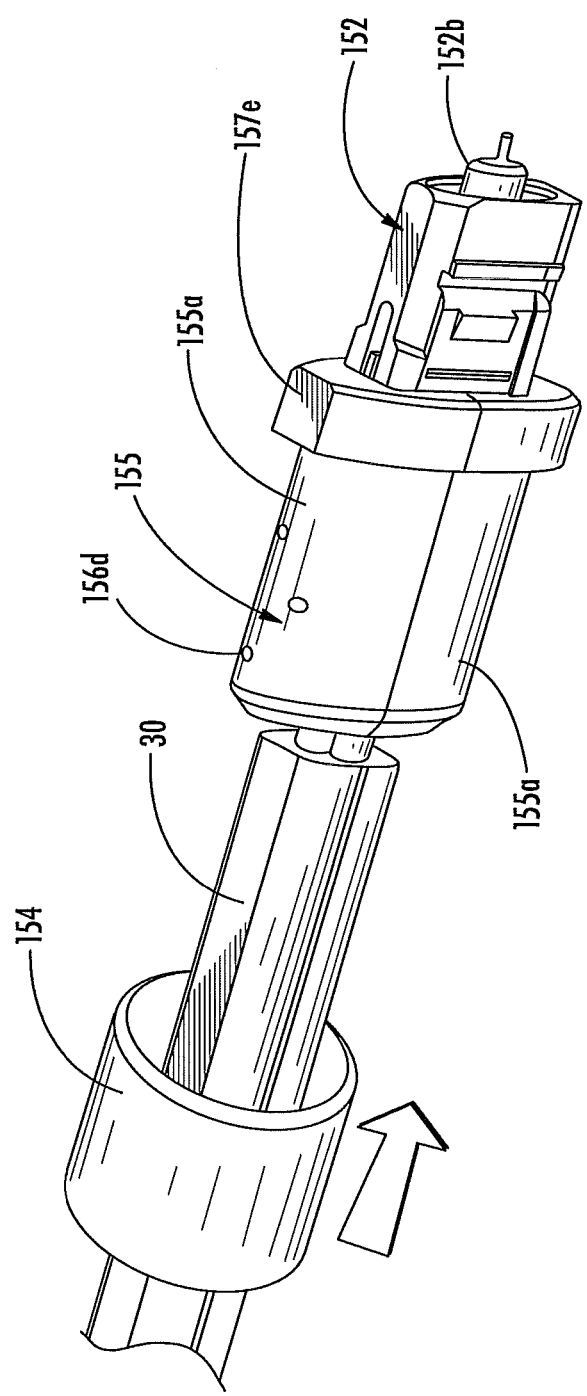
FIG. 15d shows another partially assembled view of the preconnectorized fiber optic cable of FIG. 13 where the crimp band is being slid into position onto the crimp housing.

As best shown in FIG. 15*d*, the crimp assembly includes the crimp housing 155 and the crimp band 154. The crimp housing 155 has two shells 155*a* that are held together by the crimp band 154 when the preconnectorized fiber optic cable is assembled. Although two identical shells are shown, other suitable shell configurations are possible, such as shells that are greater than or less than half of the crimp housing, or configurations having more than two shells. The crimp band 154 is preferably made from brass, but other suitable crimpable materials may be used. The crimp housing 155 is configured for securing the connector assembly 152 as well as providing strain relief to the fiber optic cable 30 by securing one or more of the strength members 34. Additionally, an epoxy, adhesive, glue, or the like may be used for securing the strength members 34 within the crimp housing 155. This advantageously results in a relatively compact connector arrangement using fewer components. Moreover, the crimp assembly allows the preconnectorized fiber cable 110 to be assembled quickly and easily. Of course, other embodiments are possible according to the present invention. For example, the connector body 152a may be integrally molded into the crimp housing 155 in a ST type configuration so that a twisting motion of the crimp housing 155 secures the ST-type connector with a complementary mating receptacle.

FIGS. 15a-15d depict several steps during the process of attaching the crimp assembly 155 to the fiber optic cable 30. FIG. 15a shows the fiber optic cable 30 with the strength members 34 and the optical component extending from the end of the fiber optic cable 30. Preparing the end of fiber optic cable 30 is relatively easy since a cutting blade can be run adjacent to the strength members 34 at the top and the bottom removing portion of the cable jacket 38 and then the strength members 34 can be pulled apart, leaving optical fiber(s) 32 encased in a portion of cable jacket 38 to provide protection the same for routing and the like. Thereafter, the remainder of the cable jacket 38 on the strength members 34 can be easily removed along with the desired length of remaining cable jacket 38 on the optical fiber(s) 32. FIG. 15b shows the inner surface of one shell 155a. In this case, only one shell 155a is illustrated since two symmetrical shells are used for crimp housing 155. In other embodiments there may be a first shell and a second shell that differs from the first. For instance, one shell may have two alignment pins, rather than each half-shell having a single alignment pin or one shell may be less than half of the crimp housing 155.

As shown in FIG. 15b, the shell 155a includes a first end 155b for securing the connector assembly 152 and a second end 155c that provides strain relief by securing one or more strength members 34. A longitudinal axis A-A is formed between the first end 155b and the second end 155c of the shell 155a near the center of the crimp housing 155, through which half of a longitudinal passage is formed. When assembled, the optical fiber(s) 32 passes through the longitudinal passage and is held in a bore of the ferrule 152b. Additionally, the shell 155a includes a cable clamping portion 156 and a connector assembly clamping portion 157.

The cable clamping portion 156 has two outboard half-pipe passageways 156a and a central half-pipe passageway 156b that is generally disposed along the longitudinal axis A-A. Half-pipe passageways 156a may include at least one rib 156c for securely clamping strength members 34 and may further include injecting an epoxy, adhesive, glue, or the like into the cable clamping portions, then crimp band 154 is crimped, thereby completing the crimp assembly. Moreover, half-pipe passageways 156a are sized for the components of fiber optic cable 30 such as the strength components 34 and the optical fiber(s) 32, but the passageways can be sized for different cable configurations.

Likewise, the shell 155a has a connector assembly clamping portion 157 that is sized for attaching the connector assembly 152. The connector assembly clamping portion 157 has a half-pipe passageway 157a that opens into and connects the central half-pipe passageway 156b and a partially rectangular passageway 157b. The half-pipe passageway 157a is sized for securing the spring push 152d and may include one or more ribs for that purpose. Rectangular passageway 157a holds/secures a portion of the connector body 152a therein and inhibits the excess rotation between the connector assembly 152 and the crimp housing 155. FIG. 15c depicts the prepared fiber optic cable 30 of FIG. 15a having the connector assembly 152 attached and positioned in a first shell 155a. The alignment of the two shells is accomplished by inserting pins 157c into complementary bores 157d of the two shells. FIG. 15d shows both half-shells 155a of the crimp housing 155 disposed about the fiber optic cable 30 before the crimp band 154 is installed thereover. Additionally, shells may include one or more bores 156d that lead to one of half-pipe passageways 156a or 156b. The bores 156d allow for inserting an epoxy, adhesive, glue, or the like into the crimp housing 155, thereby providing a secure connection for strain relief.

As shown in FIG. 12, when fully assembled, at least a portion of the crimp assembly fits into the shroud 160. Additionally, the crimp housing 155 is keyed to direct the insertion of the crimp housing/crimp assembly into the shroud 160. In this case, the shells 155A include planar surfaces 157e (FIG. 15d) on opposites sides of the crimp housing 155 to inhibit relative rotation between the crimp housing 155 and the shroud 160. In other embodiments, the crimp assembly may be keyed to the shroud using other configurations such as a complementary protrusion/groove or the like.

As best shown in FIGS. 14a and 14b, the shroud 160 has a generally hollow cylindrical shape with a first end 160a and a second end 160b. The shroud 160 generally protects the connector assembly 152 and may also key the hardened connector 150 with the respective mating receptacle 130. The shroud 160 includes a through passageway between first and second ends 160a and 160b for receiving a portion of the crimp housing. As discussed, the passageway of the shroud 160 is keyed so that the crimp housing 154 is inhibited from excess rotation when the hardened connector 150 is assembled. Additionally, the passageway has an internal shoulder (not visible) that inhibits the crimp assembly from being inserted beyond a predetermined position.

The first end 160a of the shroud 160 includes at least one opening (not numbered) defined by the shroud 160. The at least one opening extends from a medial portion of the shroud 160 to the first end 160a. More specifically, the shroud 160 includes a pair of openings on opposite sides of the first end 160a, thereby defining alignment portions or fingers 161a, 161b. In addition to aligning the shroud 160 with receptacle during mating, the alignment fingers 161a, 161b may extend slightly beyond the connector assembly 152, thereby protecting the connector assembly. As shown in FIG. 14b, the alignment fingers 161a, 161b have different shapes so that the hardened connector 150 and the receptacle 130 only mate in one orientation. This orientation can be marked on the shroud 160 using alignment indicia 160c so that the craftsman can quickly and easily mate the preconnectorized fiber optic cable 110 with the receptacle 130. In this case, the alignment indicia 160c is an arrow molded into the top alignment finger of the shroud 160, however, other suitable indicia may be used. As shown, the arrow is aligned with complimentary alignment indicia 130c disposed on the receptacle 30 (FIG. 11b), thereby allowing the craftsman to align the indicia 160c, 130c so that the alignment fingers 161a, 161b can be seated into the receptacle 130. Thereafter, the craftsman engages the external threads of the coupling nut 164 with the complimentary internal threads of the receptacle 130 to establish the optical connection as shown in FIG. 11c.

A medial portion of the shroud 160 has one or more grooves 162 for seating one or more O-rings 159. The O-ring 159 provides a weatherproof seal between the hardened connector 150 and the receptacle 130 or the protective cap 168. The medial portion also includes a shoulder 160d that provides a stop for the coupling nut 164. The coupling nut 164 has a passageway sized so that it fits over the second end 160b of the shroud 160 and easily rotates about the medial portion of the shroud 160. In other words, the coupling nut 164 cannot move beyond the shoulder 160d, but the coupling nut 164 is able to rotate with respect to the shroud 160. The second end 160b of the shroud 160 includes a stepped down portion having a relatively wide groove (not numbered). The stepped down portion and the groove are used for securing heat shrink tubing 167. Heat shrink tubing 167 is used for weatherproofing the preconnectorized fiber optic cable. Specifically, the stepped down portion and groove allow for the attachment of heat the shrink tubing 167 to the second end 160b of the shroud 160. The other end of heat shrink tubing 167 is attached to the cable jacket 38, thereby inhibiting water from entering hardened connector 150.

After the heat shrink tubing 167 is attached, the boot 166 is slid over heat shrink tubing 167 and a portion of the shroud 160. The boot 166 is preferably formed from a flexible material such as KRAYTON, but other materials and/or configurations are possible. The heat shrink tubing 167 and boot 166 generally inhibit kinking and provide bending strain relief to fiber optic cable 30 near the hardened connector 150. The boot 166 has a longitudinal passageway (not visible) with a stepped profile therethrough. The first end of the boot passageway is sized to fit over the second end of the shroud 160 and the heat shrink tubing 167. The first end of the boot passageway has a stepped down portion sized for the fiber optic cable 30 and the heat shrink tubing 167 and acts as stop for indicating that the boot is fully seated. After the boot 166 is seated, the coupling nut 164 is slid up to the shoulder 160c so that the lanyard 169 can be secured to the boot 166. Specifically, a first end of the lanyard 169 is positioned about a groove 166a on the boot 166. Thus, the coupling nut 164 is captured between shoulder 160c of the shroud 160 and the lanyard 169 on the boot 166. This advantageously keeps the coupling nut 164 in place by preventing it from sliding past the lanyard 169 down onto the fiber optic cable 30.

A second end of the lanyard 169 is secured to the protective cap 168 using a snap-fit into a groove (not numbered) on a front end of the protective cap 168. Consequently, the protective cap 168 is prevented from being lost or separated from the preconnectorized fiber optic cable 110. Additionally, the protective cap 168 can also include an eyelet 168a. The eyelet 168a is useful for attaching a fish-tape or other pulling device so that the preconnectorized fiber optic cable 110 can be pulled through a duct or the like. The protective cap 168 has internal threads for engaging the external threads of the coupling nut 164 to secure it in place when not making an optical connection. Moreover, one or more O-rings 159 provide a weatherproof seal between the hardened connector 150 and the protective cap 168 when installed. When threadedly engaged, the protective cap 168 and the coupling nut 164 of the hardened connector may rotate with respect to the remainder of the preconnectorized fiber optic cable 110, thereby inhibiting torsional forces during pulling of the same.

The preconnectorized fiber optic cable 110 may have any suitable length desired, however, the preconnectorized fiber optic cable 110 can have standardized lengths. Moreover, the preconnectorized fiber optic cable 110 may include a length marking indicia for identifying its length. For instance, the length marking indicia may be a marking located on the cable such as a colored stripe or denoted in a print statement. Likewise, the length marking indicia may be a marking located on the hardened connector 150. In one embodiment, length marking indicia may be denoted by a marking on the coupling nut 164 or the protective cap 168, such as a colored stripe. In any event, the length-marking indicia should be easily visible so the craftsperson may identify the preconnectorized fiber cable length. By way of example, a red marking indicia on the coupling nut 164 denotes a length of about 150 feet while an orange marking indicia denotes a length of about 300 feet.

The described explanatory embodiment provides an optical connection between the hardened connector 150 and its complementary receptacle 130 that can be made in the field without requiring any special tools, equipment, or training. Additionally, the optical connection is easily connected or disconnected by merely mating or unmating the ends of the preconnectorized fiber optic cable 110 with the respective receptacle by threadly engaging or disengaging the coupling nut 164 and pulling the hardened connector 150 from the complementary receptacle 130. Thus, the preconnectorized fiber optic cables of the present invention allow deployment of optical waveguides toward the subscriber or other location in an easy and economical manner, thereby providing the end user with increased bandwidth. Furthermore, the concepts of the present invention can be practiced with other hardened connectors and/or other preconnectorized fiber optic cable configurations.

Figure 16:
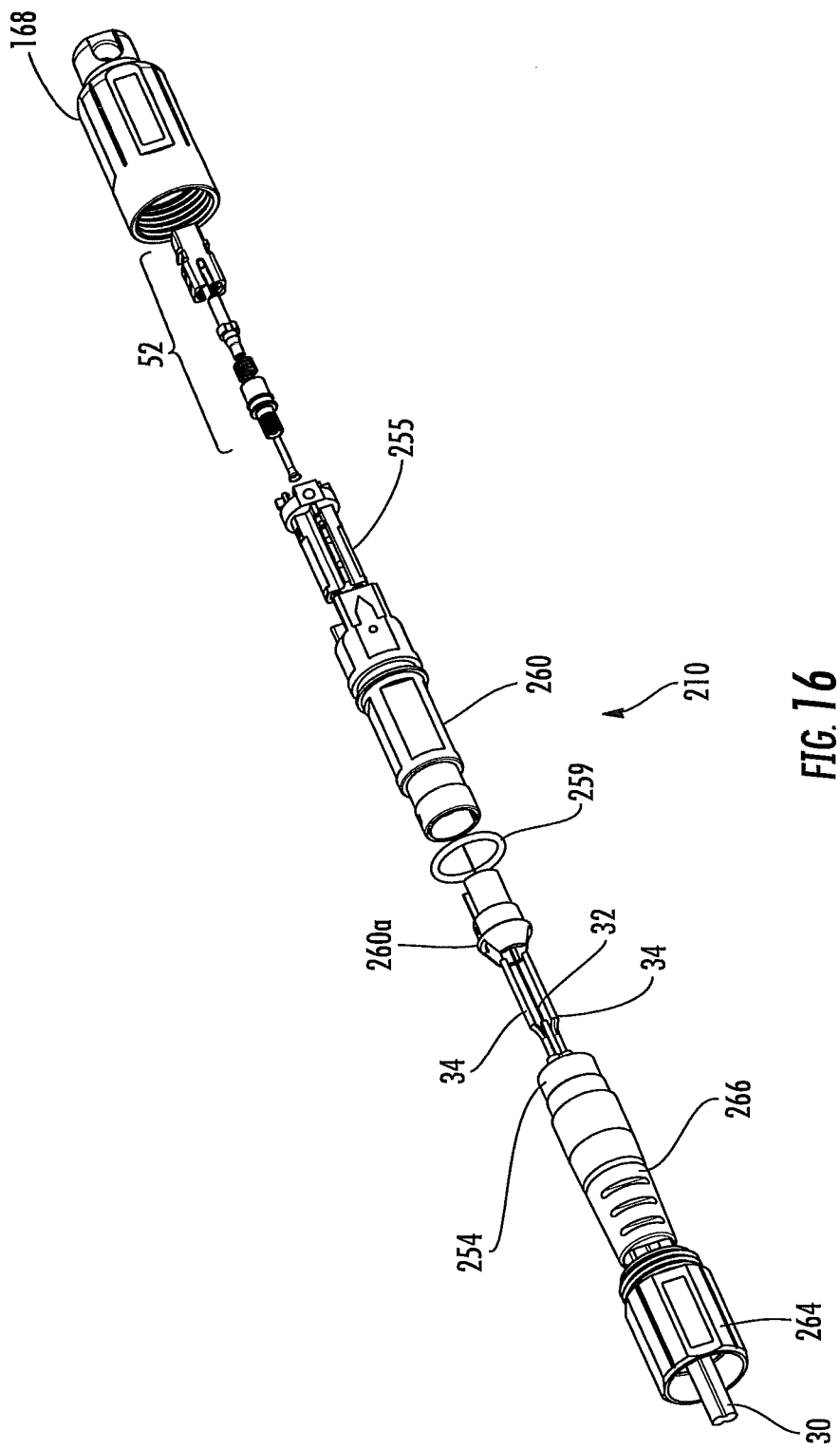
FIG. 16 is an exploded view of another preconnectorized fiber optic cable using a different hardened connector.

For instance, FIG. 16 depicts an exploded view of another preconnectorized fiber optic cable 210 using a hardened connector 250 attached to the fiber optic cable 30. The connector 250 is similar to the hardened connector 150. In other words, hardened connector 250 is suitable for mating with a complementary receptacle 130 as is the hardened connector 150, but uses a different structure for securing the fiber optic cable 30 and the connector assembly 52. The hardened connector 250 also includes a retention body 255, a shroud 260 that receives one or more O-rings 259, an optional shroud end piece 260a, a coupling nut 264, a cable boot 266, a heat shrink tube 254, and protective cap 268 secured to boot 266 or other suitable portion of the assembly by a lanyard 269.

The fiber optic cable 30 is prepared for connectorization with the hardened connector 250 in a manner similar to that shown in FIG. 15a. The exposed strength members 34 of the fiber optic cable are secured to the retention body 255. The retention body 255 includes a central bore (not visible) for passing the optical fiber 32 of the fiber optic cable 30 therethrough for insertion into the ferrule of the connector assembly 152. Additionally, the retention body 255 has two bores disposed outboard of the central bore sized for receiving the strength members 34 therein. One method for the securing strength members 34 to the retention body 255 uses a radiation curable, heat curable epoxy, adhesive, glue, or the like for securing the same. If a radiation curable substance is used such as a light or UV curable epoxy, then the retention body should be translucent for allowing the radiation for curing to reach and cure the radiation curable substance in a suitable manner. The front end of the retention body 255 is used for securing the connector assembly 152 thereto. Specifically, the connector assembly 152 snap-fits to the retention body 255 using resilient fingers or the like, but other suitable structures are possible for securing the connector assembly 152 to retention body. Additionally, the connector assembly 152 may be secured to the retention body 255 in a manner that allows for some rotational movement. Thereafter, the retention body 255 assembly at least partially fits within the shroud 260 and is keyed to the shroud 260 inhibit rotation therebetween. The other components of the hardened connector 250 are similar to the hardened connector 150.

As shown, the retention body 255 is a monolithic structure, but it may have a structure that includes more that one piece. For instance, the strength members 34 could have a mechanical attachment to the retention body 255 instead of using an epoxy, adhesive, glue, or the like for securing the same. Specifically, the retention body 255 can have wedges (i.e., one-way grips like a Chinese finger toy) that secure the strength members 34 as they are inserted into the same. The hardened connector 150 is also suitable for use with automated assembly techniques.

Figure 17:
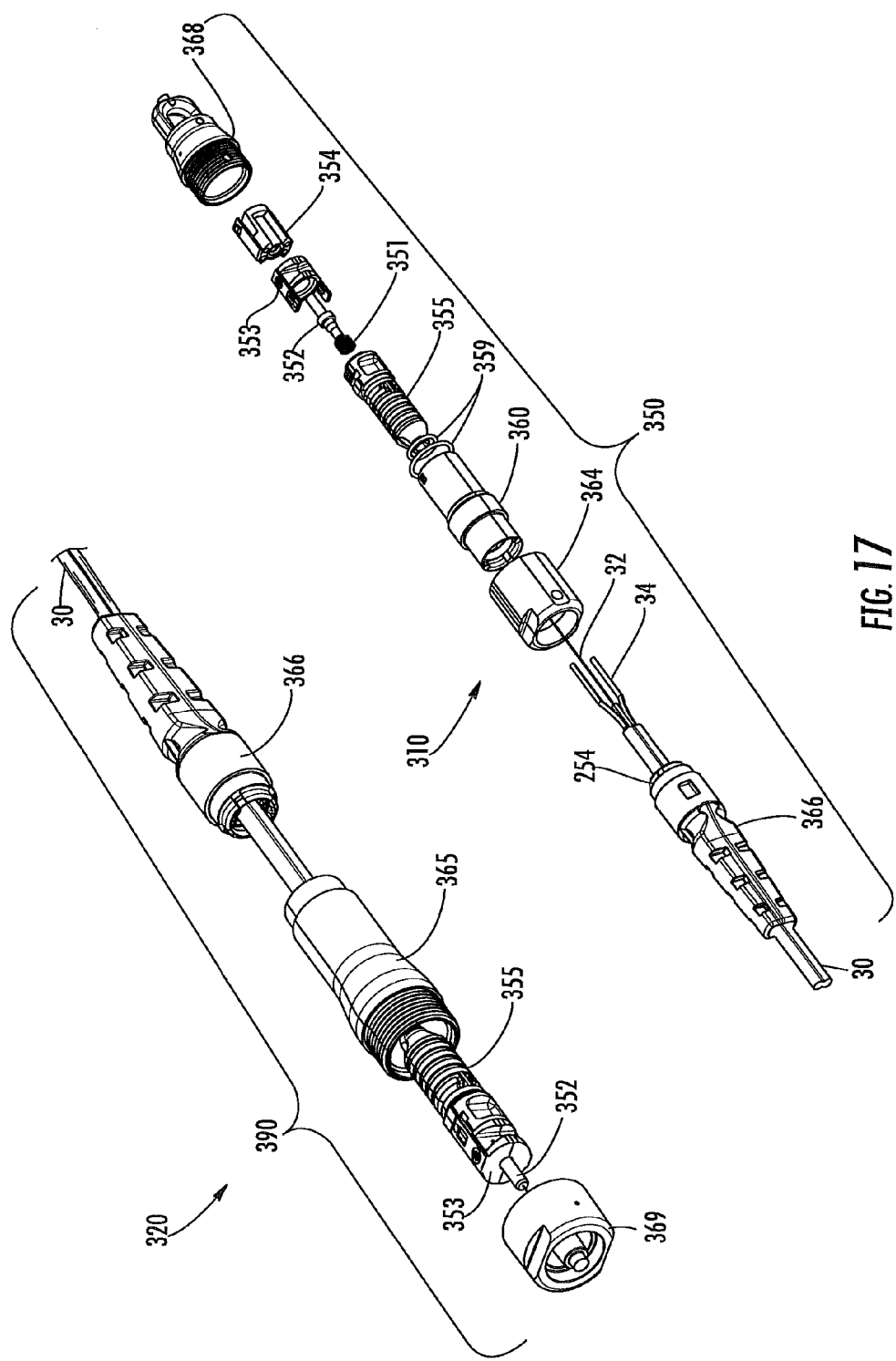
FIG. 17 depicts partially exploded views of two preconnectorized fiber optic cables each having a complementary hardened connector.

Other hardened connectors can be used with the fiber optic cables of the present invention. FIG. 17 illustrates complementary preconnectorized fiber optic cables 310 and 320 that are suitable for mating together. Specifically, FIG. 17 shows a partially exploded view of a preconnectorized fiber optic cable 310 using a hardened connector 350 on a first fiber optic cable 30, along with a partially exploded view of its complementary preconnectorized fiber optic cable 320 having hardened connector 390 on a second fiber optic cable 30. The hardened connectors 350 and 390 are similar hardened connectors (i.e., some components are the same or similar thereby reducing complexity) that are intended to have opposing ferrules mate through an alignment sleeve 354 that is a portion of hardened connector 350, instead of mating with a complementary receptacle like hardened connectors 150 and 250. In other words, a coupling nut 364 of the hardened connector 350 connects to the coupling sleeve 365 of hardened connector 390 for establishing the optical connection therebetween.

The hardened connector 350 includes a spring 351, a ferrule assembly 352, an inner housing 353, the alignment sleeve 354, a retention body 355, one or more O-rings 359, an outer housing 360, a coupling nut 364, a boot 366, and a cap 368. The hardened connector 350 is similar to the hardened connector 250 in that it has a retention body 355 having a central bore (not numbered) therethrough for passing the optical fiber 32 therethrough and outboard bores (not numbered) for receiving and attaching the strength members 34 of the fiber optic cable 30 using an epoxy, glue, adhesive, or the like. However, ferrule assembly 352 does not snap-fit to the retention body 355; instead, the spring 351 biases the ferrule assembly 352 forward and the inner housing 353 snap-fits to the retention body 355 using resilient arms (not numbered), thereby positioning the ferrule assembly 352 relative to the retention body 355. Specifically, the inner housing 355 includes a centrally located hole therethrough sized to allow a portion of the ferrule to protrude beyond the front of the inner housing 355 when assembled. As shown, the hardened connector 350 includes two different sized O-rings 359. The smaller O-ring is sized to attach to a medial shoulder (not numbered) portion of the retention body 355 and the larger O-ring is sized to attach to the outer housing 360 at a medial shoulder (not numbered) for sealing portions of the hardened connector. When assembled, the retention body 355 (along with the attached components) slides back into the outer housing 360 and is secured therein by the alignment sleeve 354.

Figure 19:
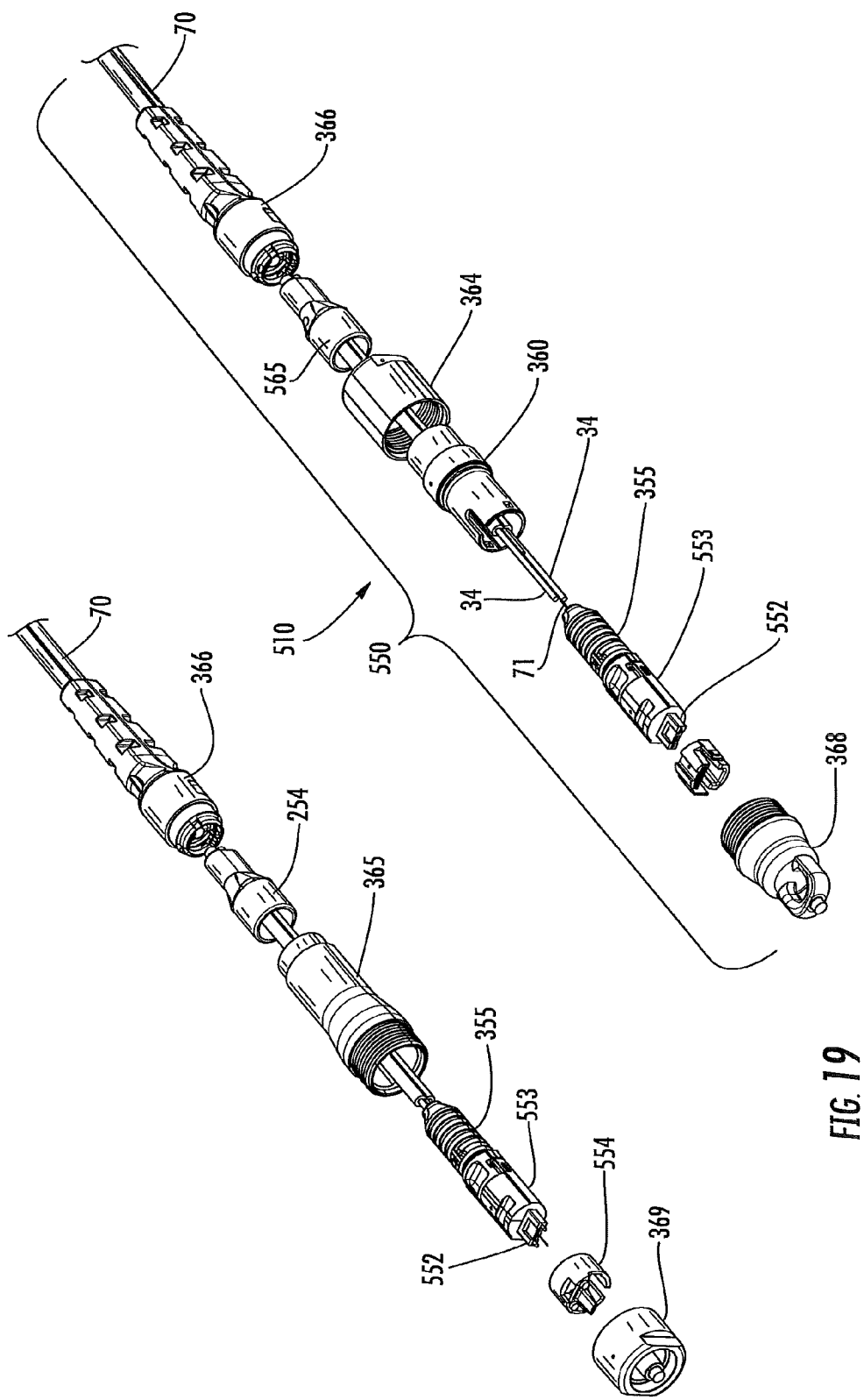
FIG. 19 depicts partially exploded views of two preconnectorized fiber optic cables each having a complementary hardened connector similar to the hardened connectors of FIG. 17.

As shown, the alignment sleeve 354 includes one or more resilient fingers (not numbered) that cooperates with one or more windows (not numbered) on the outer housing 360 to secure the components together in the proper position. The retention body 355 is keyed to the outer housing 360 using appropriate keying geometry to inhibit rotation therebetween. The outer housing 360 also includes a keying slot (not numbered) as best shown in FIG. 19 for aligning the hardened connector 350 with the hardened connector 390 and the alignment sleeve 354 also includes a keying portion (not visible) such as a recess that aligns with keying slot of outer housing 360. The hardened connector 350 may also include a heat shrink tubing 254 to form a seal between the retention body 355 and the fiber optic cable 30. Thereafter, the boot 366 is attached to the outer housing 36 using an epoxy, glue, adhesive, or the like, thereby keeping coupling nut 364 in place. In other words, coupling nut 364 is trapped between a shoulder of the outer housing 360 and a shoulder of the boot 366 while being free to rotate. When assembled, a portion of the outer housing 360 extends beyond the coupling nut 364 for insertion into the hardened connector 390. As shown, the cap 368 can include an eyelet (not numbered) for attaching a pulling device to the hardened connector 350 and when installed protects the end portion of the hardened connector 350. Additionally, the assembly can optionally include a lanyard (not shown) with one end secured onto the boot 366 below the coupling nut 364 and the other end of lanyard being attached to the cap 368 for keeping it from being lost or misplaced.

The hardened connector 390 includes many of the same components as hardened connector 350. For instance, the hardened connector 390 includes spring 351 (not visible), ferrule assembly 352, inner housing 353 (not visible), retention body 355, one or more O-rings 359, heat shrink tube (not visible), and boot 366. The hardened connector 390 also has components that are similar to the hardened connector 350 such as a coupling sleeve 365 (instead of coupling nut 364) and a cap 369 that attaches to the coupling sleeve 365 for protection; however, no outer housing or similar component is used. Instead, the coupling sleeve 365 receives the retention body 355 and is keyed to the same to inhibit rotation therebetween; otherwise, the hardened connector 390 is similar to the hardened connector 350 and assembled in a like fashion. Moreover, the retention body 355 is set back a distance from the front end of the coupling sleeve 365 to receive an extending portion of the hardened connector 350 during mating of the two hardened connectors. Thus, the craft can quickly and easily make a reliable optical connection (or break an optical connection) between the optical fibers of the first and second fiber optic cable.

The concepts of the hardened connector 350 and 390 are advantageous because a whole family of hardened connectors can be constructed by simply changing and/or adding a few components, thereby making the hardened connectors adaptable to fiber optic cables having other fiber counts. For instance, by changing the inner housings and the adapter the hardened connectors may be configured for securing more than one ferrule assembly or other types of ferrules, thereby allowing preconnectorization of fiber optic cables having other fiber counts.

Figure 18:
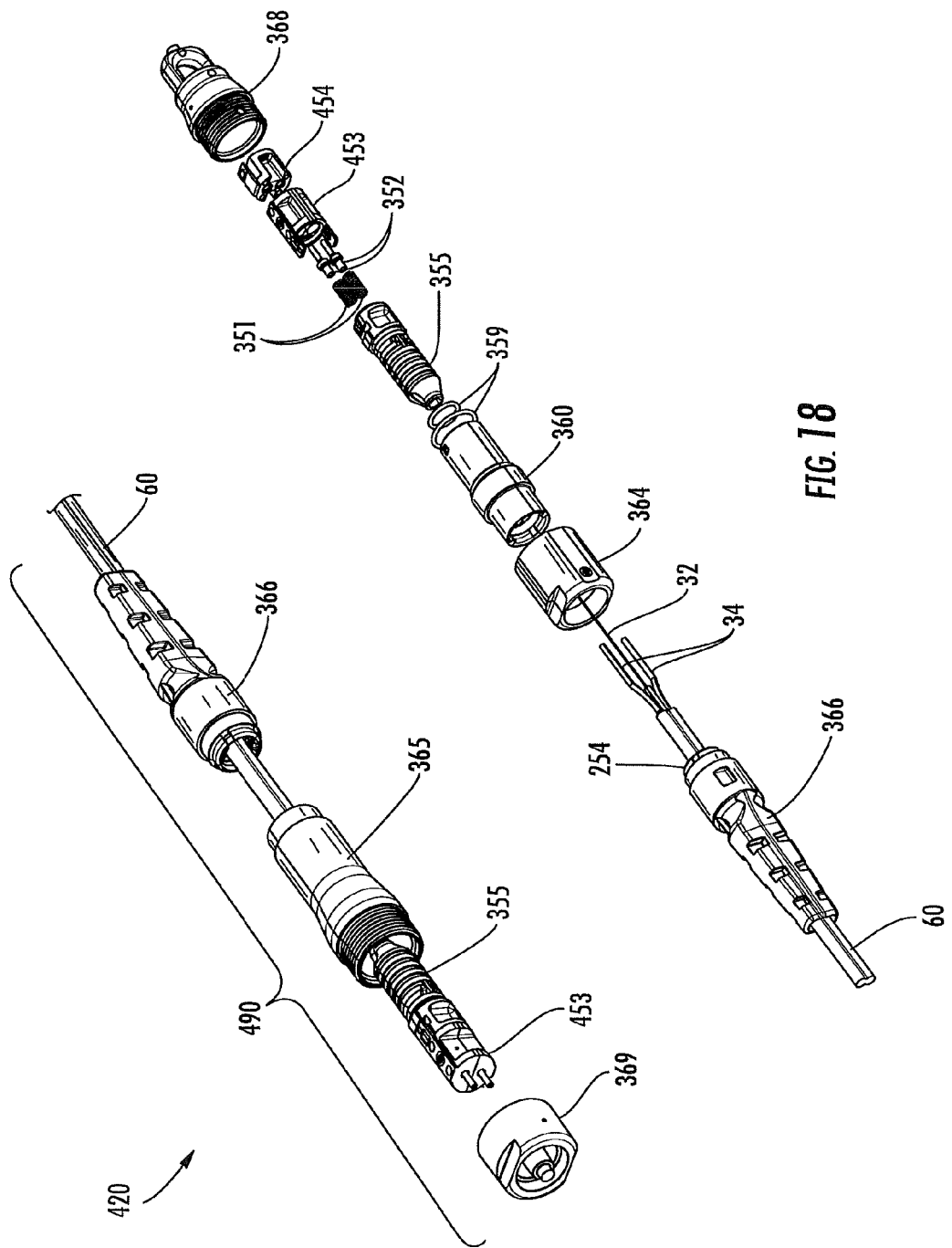
FIG. 18 depicts partially exploded views of two preconnectorized fiber optic cables each having a complementary hardened connector similar to the hardened connectors of FIG. 17.

By way of example, FIG. 18 depicts complementary preconnectorized fiber optic cables 410 and 420 that are suitable for mating together. Specifically, FIG. 18 shows a partially exploded view of the preconnectorized fiber optic cable 410 using a hardened connector 450 on a first fiber optic cable 60 along with a partially exploded view of its complementary preconnectorized fiber optic cable 420 having hardened connector 490 on a second fiber optic cable 60. In other words, the hardened connectors 450 and 490 are suitable for fiber optic cables having two optical fibers 32. The components of the hardened connector 450 are similar to hardened connector 350, except for inner housing 453 on both hardened connectors and adapter 454. Simply stated, the inner housing 453 is similar to the inner housing 353, but it includes two spaced apart holes for receiving two respective ferrules 352 therethrough. Likewise, the adapter 454 is similar to the adapter 354, but it has two spaced apart bores to allow the two ferrules of each hardened connector to mate, instead of a centrally disposed bore.

In other variations, hardened connectors similar to the hardened connectors 350 and 390 may include one or more multi-fiber ferrules for preconnectorizing fiber optic cable 70 or other similar fiber optic cables. For instance, FIG. 19 depicts complementary preconnectorized fiber optic cables 510 and 520 that are suitable for mating together. Specifically, FIG. 19 shows a partially exploded view of the preconnectorized fiber optic cable 510 using a hardened connector 550 on a first fiber optic cable 70 along with a partially exploded view of its complementary preconnectorized fiber optic cable 520 having hardened connector 590 on a second fiber optic cable 70. In other words, the hardened connectors 550 and 590 are suitable for fiber optic cables having multiple optical fibers 32 such as four, eight, twelve, or other suitable fiber counts. The components of the hardened connector 550 are similar to the hardened connector 350, except for inner housing 553 on both hardened connectors, spring (not visible), and adapter 554. Simply stated, the inner housing 553 is similar to the inner housing 353, but it includes a rectangular opening for receiving a multi-fiber ferrule 552 therethrough. Likewise, the adapter 454 is similar to the adapter 354, but it has a rectangular bore to allow the rectangular multi-fiber ferrule of each hardened connector to mate, instead of a centrally disposed bore. Other variations of hardened connectors according to the invention are possible such as multiple multi-fiber ferrules or the like.

FIG. 20 is a cross-sectional view of a fiber optic cable 610 according to another embodiment of the invention. The cable 610 may be generally similar in shape and dimensions to the cable 30 illustrated in FIG. 3, and its individual components may be constructed from similar or identical materials to the corresponding components of the cable 610. The cable 610 has one or more optical fibers 620, a first and a second strength component 630, and a cable jacket 640. The first and second strength components 630 are disposed on opposite sides of the optical fiber 620 and have axial centerlines 634. The fiber 620 also has an axial centerline (not illustrated) located at the center of its cross-section that may be generally aligned with the axial centerlines 634 of the strength components 630 along a common plane A-A. The orientation of the strength components 630 on the common plane A-A in part provides preferential bend characteristics to the fiber optic cable 610. The axial centerlines of the fiber 620 or fibers in the cable 610 need not be exactly aligned with the plane passing through the axial centerlines of the strength components 630, and may move off of the plane, e.g. "up" and "down" with respect to the strength components 630 along the length of the cable 610. For the purposes of this specification, when the fiber or fibers of a cable are said to be "generally aligned with" or "aligned with" a plane passing through two strength components, it is understood that the fiber may be slightly offset from that plane, for example, by 0.5 millimeters in either direction.

In the exemplary embodiment shown in FIG. 20, the cable jacket 640 envelops and may contact the optical fiber 620 and also envelops and may contact both strength components 630. The cable jacket 640 has a medial height MH which is measured as the jacket height or thickness in a medial or center region 646 of the cable cross-section, the medial region 646 being the portion of the jacket 640 located between the strength members 630. The medial height MH may also be defined as the height of the cable at the centerline of the optical fiber or group of optical fibers, or the height at a longitudinal bisection plane of the cable 610. The medial height MH may be measured between flat or relatively flat opposed medial surfaces 648 of the medial region 646, extending above and below the optical fiber 620. An end or total height EH of the cable jacket 640 is measured as the thickness of the jacket 640 at end portions 650 of the cable cross-section, extending above and below the centerline of each strength component 630. In the exemplary embodiments, the end height EH corresponds to the total height of the cable. In the exemplary embodiment, the end portions 650 extend outwardly from the medial region 646 in generally circular cross-sections. Quantities of adhesion promoter 654 may be included on the strength components 630 to promote bonding with the cable jacket 640. As illustrated, the adhesion promoters disclosed in this specification and in the figures appear to separate the cable jackets from the strength components. For the purposes of this specification, a strength component is considered to be "in contact" with a cable jacket if an adhesion promoter is interposed between the strength component and the cable jacket to promote bonding therebetween.

According to one aspect of the present embodiment, the cross-sectional footprint 660, or cross-sectional area, of the fiber optic cable 610 is substantially smaller than the cross-sectional footprints of conventional fiber optic cables of the same type. The cross-sectional footprint 660 is substantially smaller than the conventional cables in part because the cable 610 does not require a buffer tube as do conventional cables of this type. The area of the cross-sectional footprint 660 may be less than about 25 millimeters squared, for example. According to one embodiment, the area of the cross-sectional footprint 660 is in the range of 8 millimeters squared to 22 millimeters squared. According to another embodiment, the area of the cross-sectional footprint 660 is in the range of 10 millimeters squared to 18 millimeters squared. The cross-sectional footprint 660 of the illustrated exemplary cable 610 is 13.38 millimeters squared. The area AJ of the polymeric material forming the jacket 640 can be less than 13 millimeters squared.

According to another aspect of the present embodiment, the medial height MH is less than the end height EH at the strength components 630. Relief or recessed portions 658 in the cable jacket 640 are included to reduce stresses on the optical fiber 620 in order to preserve optical performance, as discussed in further detail below. The height ratio for the cable 610 is defined as the ratio of the medial height MH to the end height EH, or MH/EH. According to one embodiment of the invention, the height ratio is less than 0.95, in the range of 0.5-0.95. According to another embodiment, the height ratio is less than 0.85, in the range of 0.6-0.85. The height ratio of the illustrated exemplary cable 610 is about 0.83.

The exemplary cable 610 has an overall width W in the range of about 3-6 millimeters. The radii R1 of the end portions 650 can be in the range of about 1-2 millimeters. The radii R2 of the strength components 630 can be in the range of about 0.35-0.9 millimeters. The separation distance S1 of the strength member axes 634 can be in the range of about 1.9-2.6 millimeters. The separation distance S2 represents the spacing between the nearest points of the spaced strength components 630, and can be in the range of 0.8-1.5 millimeters. In another embodiment, the separation distance S2 is in the range of 0.9-1.35 millimeters.

Example 1

A fiber optic cable 610 as illustrated in FIG. 20 has a height of 3 millimeters, a width W of 5.3 millimeters, a separation distance S1 of 2.3 millimeters, strength components 630 each with a radius R1 of 0.625 millimeters, a medial height MH of 2.5 millimeters, an end height EH of 3 millimeters, and a height ratio MH/EH of 0.833. The cable jacket 640 is constructed from MDPE (Medium Density Polyethylene), the strength components 630 are constructed from GRP (Glass Reinforced Plastic), the adhesion promoter 654 is EAA (Ethylene Acrylic Acid), and the optical fiber 620 has a diameter of 0.255 mm (including a 0.01 mm color coating).

According to another aspect of the present embodiment, the small cross-sectional footprint of fiber optic cable 610 allows for a smaller coil diameter compared with conventional fiber optic cables. Consequently, relatively long lengths of the fiber optic cable 610 can be stored in a relatively small volume. For example, the volume occupied in coiling 60 meters of the fiber optic cable 610 can be less than about 5000 cubic centimeters. The small size of the fiber optic cable 610 also allows for relatively large lengths of slack storage in small spaces for aerial installations and/or buried installations. The weight, for example, of a kilometer of the cable 610 can be less than 19 kilograms.

Figure 21A:
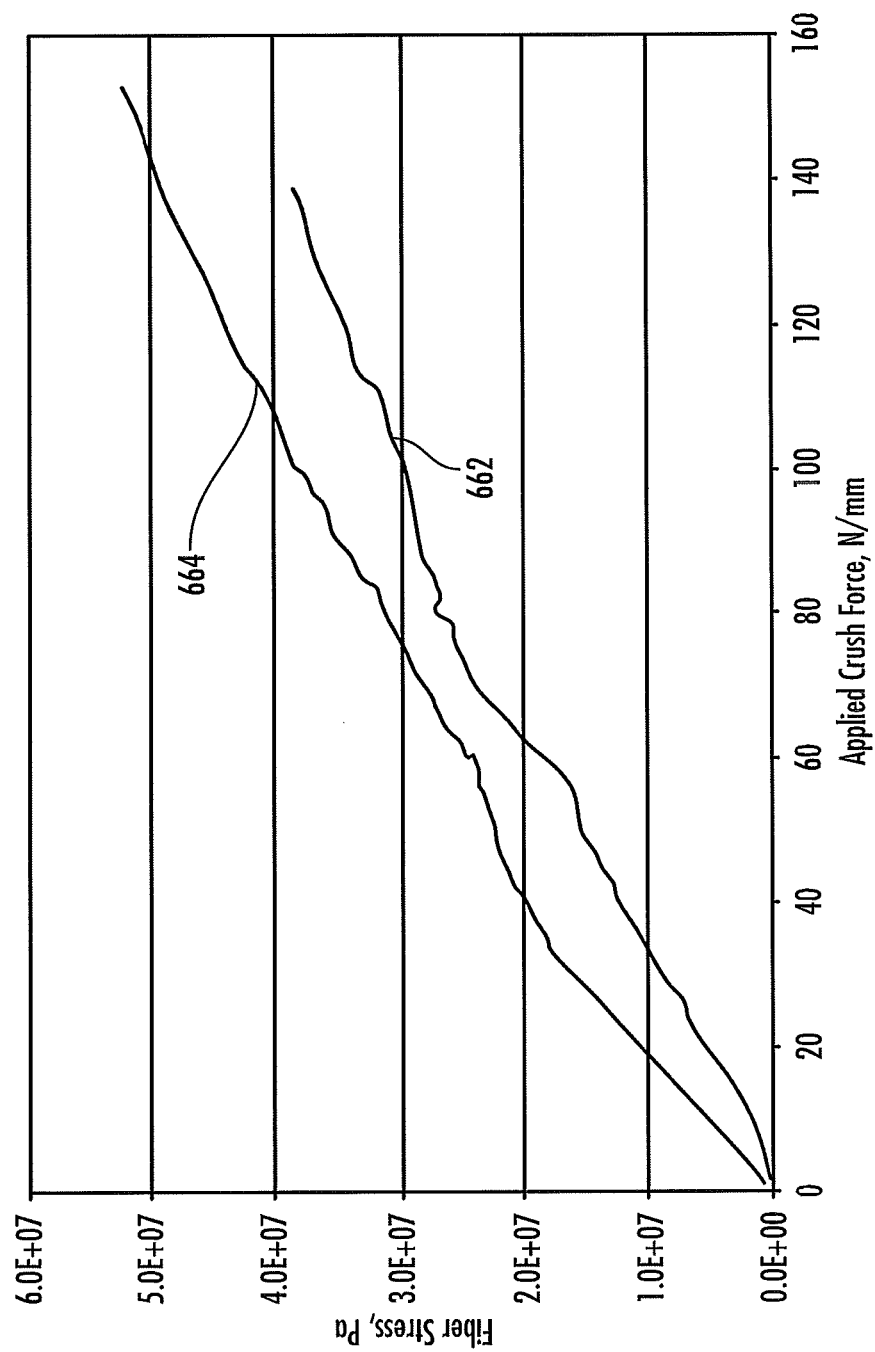
FIG. 21A is a plot of simulated fiber stresses under applied crush loads.
Figure 21B:
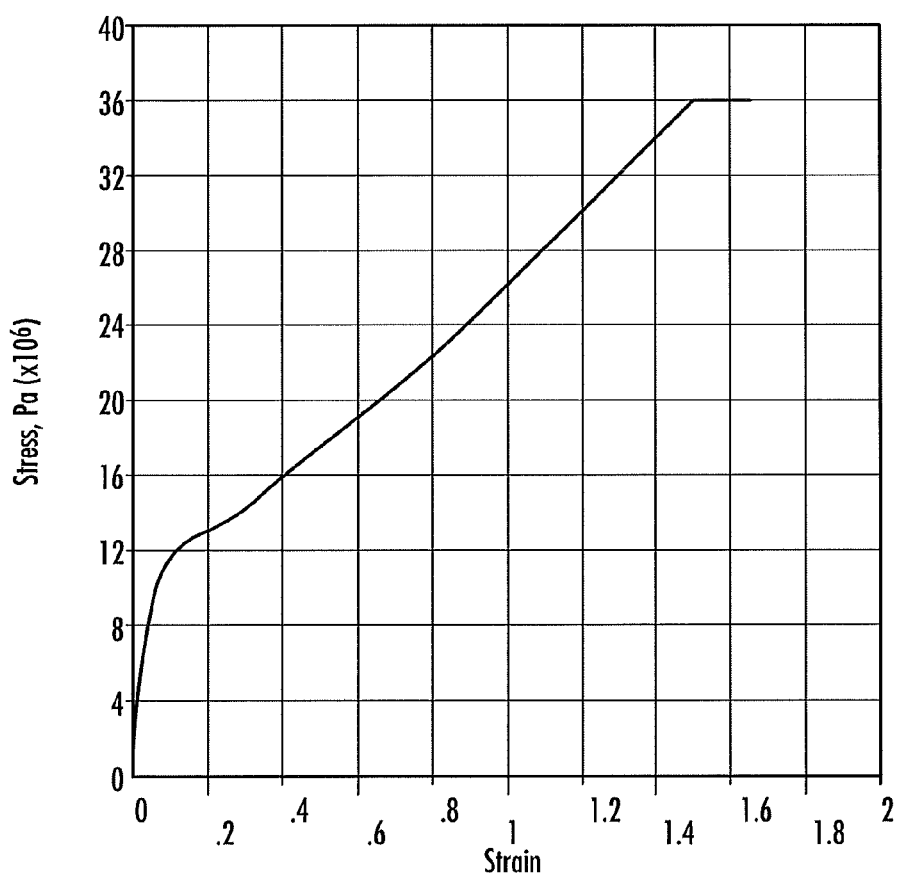
FIG. 21B is a stress-strain curve used to model jacket material.

Despite its small size and weight and high storage capacity, the fiber optic cable 610 is robust and capable of being GR-20, RDUP, IEC, and/or ICEA compliant. The cable 610 may be, for example, resistant to crush loads such as those exerted by a pressure clamp. FIG. 21A is a plot simulating induced radial stresses on an optical fiber in a cable having a cross-section of the same shape as the cable 610 (FIG. 20) under varying crush force values. FIG. 21B is a stress-strain curve used to model jacket material. In FIG. 21A, model crush data for a flat cable such as the comparison cable illustrated in FIG. 4 is included for comparative purposes. The crush data for the test cable having the cross-section illustrated in FIG. 20 is the lower line 662 and the crush data for the flat comparison cable is the upper line 664. The fiber stresses are indicated on the vertical axis in Pascals, and the applied crush forces are indicated as force values on the horizontal axis in Newtons per millimeter of crushed cable length. The stress-strain curve used to model the jacket material is illustrated in FIG. 21B. The applied forces on the cables are modeled as being applied by smooth crush plates.

Figure 22:
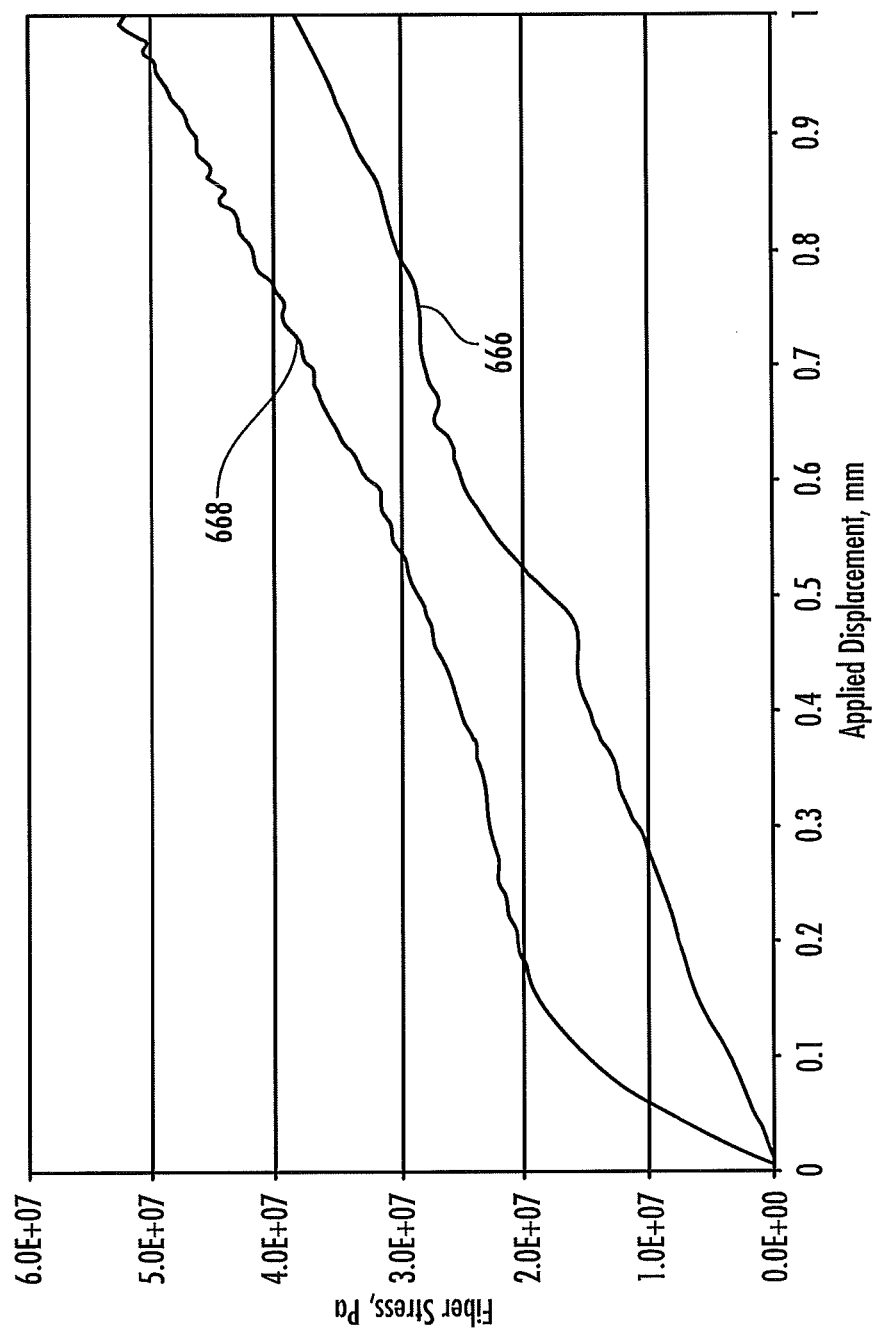
FIG. 22 is a plot of simulated fiber stresses under applied crush displacements.

FIG. 22 is a plot simulating induced radial stresses on an outer periphery of the optical fiber in a cable having a cross-section of the same shape as the cable 610 (FIG. 20) under varying crush displacement values. The crush data for the test cable having the cross-section illustrated in FIG. 20 is the lower line 666 and the crush data for the flat comparison cable is the upper line 668. The fiber stresses are indicated on the vertical axis in Pascals, and the applied displacements are indicated as distance values on the horizontal axis in millimeters. The displacement values simulate the distances that upper and lower surfaces of a cable are depressed inwardly under applied loads. For example, an induced displacement of 0.5 mm would result in a 0.5 mm reduction in the total or end height EH of the cable 610 shown in FIG. 20.

As indicated by the simulation data of FIGS. 21A, 21B and 22, the optical fiber or fibers in cables according to the present embodiments experience lower stresses and radial displacements under crush loads than conventional flat cables, in additional to smaller footprints. Reduction of stresses on and displacements of the optical fibers preserves the optical performance of the fibers, such as, by example, reducing bending of the fiber. Referring back to FIG. 20, the recessed portions 658 of the cable jacket in part act to reduce or inhibit the transference of stresses to the fibers, which are induced by loads applied to the upper and lower surfaces of the end portions 650, to the optical fiber 620 located in the medial region 646. Instead, the majority of the crush loads/stresses are borne by the strength components 630 and the surrounding jacket material. Referring to the simulation data of FIG. 21A, radial stresses in the fiber induced by applied crush loads (i.e., pressures) of up to 100 N/mm are less than about 30 MPa, radial stresses for applied crush loads of up to 80 N/mm are less than about 30 MPa, in the range of 27 MPa, and radial stresses for applied crush loads of up to 60 N/mm are less than 20 MPa, in the range of about 18 MPa. Referring to the simulation data of FIG. 22, fiber radial stresses induced by applied crush displacements of up to 0.4 mm are less than 15 MPa, radial stresses for applied crush displacements of up to 0.5 mm are less than about 19 MPa, and radial stresses for applied crush displacements of up to 0.6 mm are less than about 25 MPa.

Figure 23:
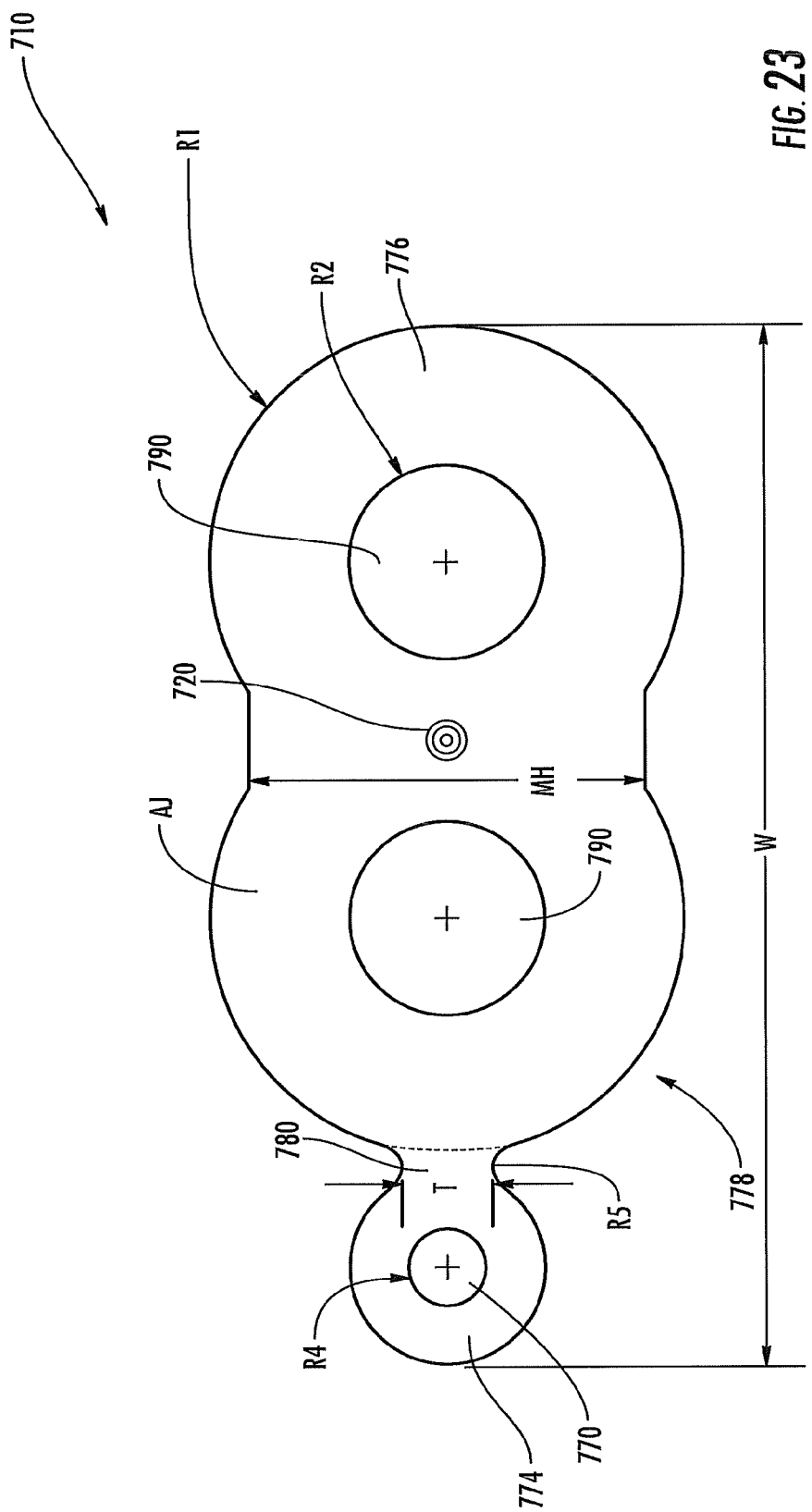
FIGS. 23 and 24 are cross-sectional views of fiber optic cables similar to the fiber optic cable shown in FIG. 20 and having a toneable element.
Figure 24:
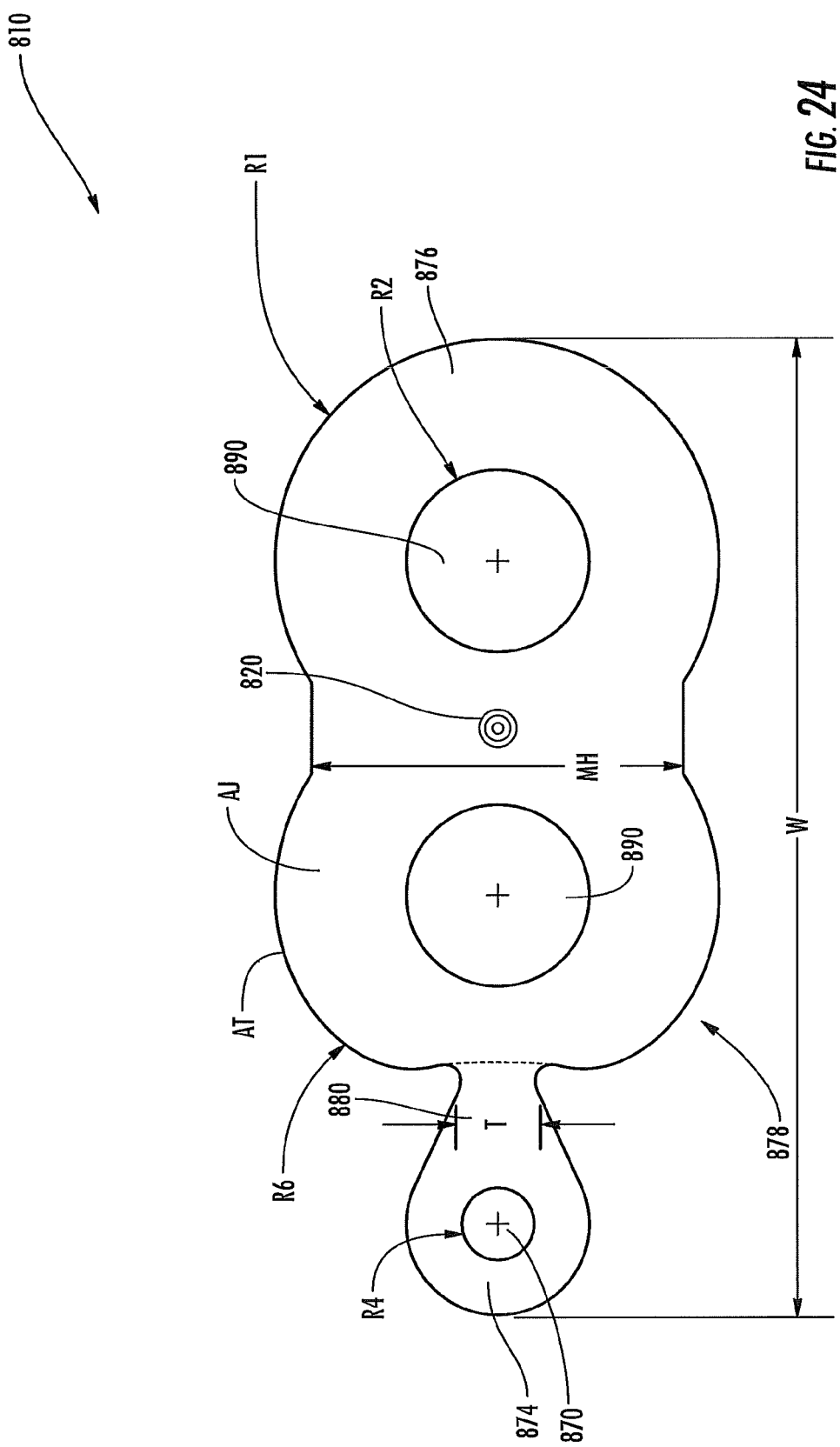

FIGS. 23 and 24 respectively illustrate cable cross-sections for cables 710, 810 of similar composition and geometry to the cable 610 with toneable elements 770, 870 included thereon. The toneable elements 770, 870 can be included for locating the fiber optic cables such as when they are buried. The toneable elements 770, 870 may be any suitable conductive material useful for determining the location of the fiber optic cable, such as a small conductive copper wire, copper-clad steel, a printed conductive strip, or the like. By way of example, the illustrated toneable elements 770, 870 are metallic copper wires having a gauge between 20-42 AWG.

Referring to FIG. 23, the fiber optic cable 710 has a toneable element 770 of radius R4 disposed within a toneable lobe 774 that is separable from a main cable body 778. The cross-section and composition of the main cable body 778 can be essentially the same as the cross-section of the cable 610. The toneable lobe 774 is attached to the jacket 776 of the main cable body 778 by a breachable web 780 that is easily separable by hand, thereby making it craft-friendly. The toneable lobe 774 includes polymeric material that can be integral with the cable jacket. The web 780 has minimum thickness T1 and can be connected by a curved surface generally having the shape of an arc with radius R5. The main cable body 778 is delineated from the web 780 by a dashed line. The web 780 can also include a preferential tear portion/geometry (not numbered) for controlling the location of the tear in the web near main cable body 778, thereby resulting in a "clean" separation. The main cable body 778 and the toneable lobe 774 may be extruded through the same extrusion tooling and using the same polymer extrudate. The total footprint or cross-sectional area AT of the main cable body 778, and the radius R2 of strength components 790 can fall within the same ranges as the cable 610.

Referring to FIG. 24, the fiber optic cable 810 has a toneable element 870 of radius R4 disposed within a toneable lobe 874 that is separable from a jacket 876 of the main cable body 878. The cross-section and composition of the main cable body 878 can be essentially the same as the cross-section of the cable 610. The toneable lobe 874 is attached to the main cable body 878, delineated by the dashed line, by a breachable web 880 that is easily separable by hand. The web 880 has minimum thickness T2 and can be connected by a curved surface generally having the shape of an arc. The main cable body 878 and the toneable lobe 874 may be extruded through the same extrusion tooling. The total footprint of cross-sectional area AT of the main cable body 878, and the radius R2 of strength components 890 can fall within the same ranges as the cable 610.

Both cable main bodies 778, 878 that may be substantially identical in cross-sectional shape, width W, height ratio MH/EH, jacket area AJ, and total area to the fiber optic cable 610 (FIG. 20), and the respective components of the cables 710, 810 may be constructed of the same or similar materials to that of the cable 610. Accordingly, the resistance to crush forces and displacement loads afforded the optical fibers 720, 820 may be similar or identical to the data illustrated in FIGS. 21A, 21B and 22. Further, each of the properties and dimensions may fall in the ranges ascribed to the cable 610.

Example 2

A toneable fiber optic cable 810 as illustrated in FIG. 24 has a height of 3 millimeters, a main body 878 width of about 5.4 millimeters, an overall with W of 6.6 mm, a separation distance between strength components centerlines of 2.3 millimeters, strength components 630 each with a radius R1 of 0.625 millimeters, a medial height MH of 2.5 millimeters, an end height EH of 3 millimeters, a height ratio MH/EH of 0.833, and a minimum neck thickness T2 of about 0.6 millimeters. The cable jacket 840 is constructed from MDPE, the strength components 830 are constructed from GRP, the adhesion promoter 654 is EAA, and the optical fiber 820 has a diameter of 0.255 mm (including a 0.01 mm color coating layer). The jacket area AJ, excluding the toneable lobe, is about 10 millimeters squared.

The optical cables constructed according to the present embodiments can be constructed to have additional desirable properties. For example, the jacket materials may be extruded such that the cable jacket contacts or is directly adjacent to the optical fiber or fibers and the strength components in the cable. The term "directly adjacent to" in the context of the fibers means there is no intervening element (such as a buffer tube) between the jacket and fibers (or a tight buffer layer on a fiber). It allows for continuous or intermittent contact and some adherence of fibers with the jacket cavity, while the contact need not be continuous (e.g., it may be intermittent) at the fiber-jacket interface along the length of the cable. The term "directly adjacent to" does allow, however, for the presence of water-swellable powder, for example, in the jacket cavity with the fibers. Further, the excess fiber length (EFL) may be controlled to induce a desired strain level to remain in the optical fiber after manufacture of the cable. In addition, extrusion of the cable jacket can be controlled so that forces required to pull fibers from the cable are not excessive.

Figure 25:
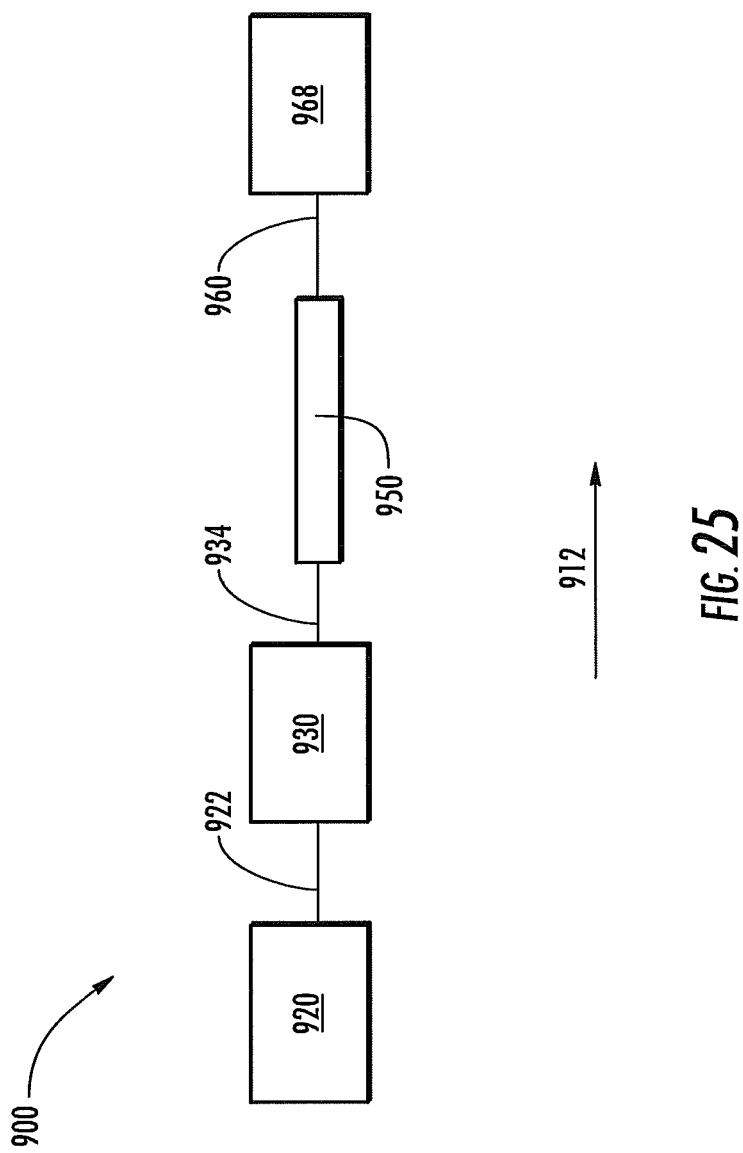
FIG. 25 is a schematic illustration of a manufacturing line used to manufacture fiber optic cables according to the present embodiments.

FIG. 25 is a schematic representation of an exemplary manufacturing line 900 for making fiber optic assemblies according to the present invention. The manufacturing line 900 may include one or more rotating reels 920 for paying out one or more optical fibers 922 along a process direction 912. Other means, such as flying off, may also be used to pay off one or more optical fibers. The illustrated manufacturing line 900 illustrates a process utilizing a single optical fiber 922, but other numbers, including 2, 4, 6, etc., of optical fibers, or groups of fibers arranged in ribbons, for example, can be used.

Still referring to FIG. 25, the fiber 922 passes into an extrusion apparatus 930. In general, the extrusion apparatus 930 extrudes a jacket around the fiber 922, which draws down around the fiber to form uncooled fiber optic assembly 934. The fiber 922 may be preheated in a preheater prior to entering the extrusion apparatus 930 to provide lower strain variation in the fiber, a smoother surface of the surrounding jacket, and may result in lower attenuation. Without being bound by theory, applicants believe preheating removes volatiles in the fiber coating to improve cable properties. Slowing the extrusion process can also be used as the hot extrusion head may act effectively as a preheater of the fiber. The uncooled fiber optic assembly 934 may then be cooled in a cooling device 950, which may be, for example, a longitudinally extending trough filled with cooling fluid, such as liquid water. The cooling device 950 cools the recently extruded jacket as the fiber optic assembly 934 moves along the process direction 912. The resultant fiber optic assembly 960 is then collected on a take-up device 968, such as, for example, a take-up reel.

The optical fiber or fibers 922 may be subject to controlled tensioning during manufacturing so that an increased tension or strain resides in the fiber after manufacturing. The tension is imparted to the fiber during manufacturing by optical fiber payoff with a tension range from 100 to 400 g-force. The ultimate strain in the fiber or fibers can be in the range of 0.0-0.2%, or, equivalently, a range of −0.2-0.0% excess fiber length at room temperature (25° C.). According to one aspect of the present embodiments, the optical performance of cables having optical fibers of higher tension/strain have reduced levels of optical attenuation. The residual strain, for example, can prevent buckling of the fiber within the relatively small cavity of the cable jacket.

According to another aspect of the present embodiments, the cables can be constructed such that forces required to pull fibers from the cable are not excessive. One aspect of the present embodiments is that the cable jacket may be directly adjacent to or in direct contact with the optical fiber or optical fibers of the cable. This configuration is shown by the exemplary cable 610 in FIG. 20. Water penetration in the cable is thereby mitigated or eliminated and the cable may have a small cross-section. In such a configuration, however, the adhesion between the jacket and fiber(s) must be controlled so that the optical fiber can be pulled from the cable jacket for connectorization, etc. Without being bound by theory, applicants believe the small cross-section of the cable allows the extruded jacket to cool very quickly, before the jacket adheres excessively to the fibers therein. Removal forces for the fiber(s) are thereby maintained within desired ranges. Table 2 tabulates peak removal forces of optical fiber from an optical cable as illustrated in FIG. 20, including variations having a toneable lobe as illustrated in FIG. 24.

TABLE 2

Peak Removal Force

| Test Cable | Cable Type | Pull Speed (meters/minute) | Removal Force (lbs) | Standard Deviation |
|---|---|---|---|---|
| #54 | dielectric | 20 | 1.5 | (0.5) |
| #54 | dielectric | 200 | 0.9 | (0.8) |
| #59 | toneable | 20 | 1.3 | (1.2) |
| #59 | toneable | 300 | 1.3 | (1.5) |
| #68 | toneable | 300 | .037 | (.04) |
| #79 | toneable | 20 | 2.5 | (2.5) |
| #80 | dielectric | 20 | 6.8 | (1.5) |
| #80 | dielectric | 200 | 7.7 | (2) |
| #82 | dielectric | 20 | 2.2 | (0.7) |
| #82 | dielectric | 300 | 0.02 | (0.06) |
| #82 | dielectric | 20 | 0.3 | (0.6) |
| #82 | dielectric | 300 | 0.03 | (0.04) |

Figure 26:
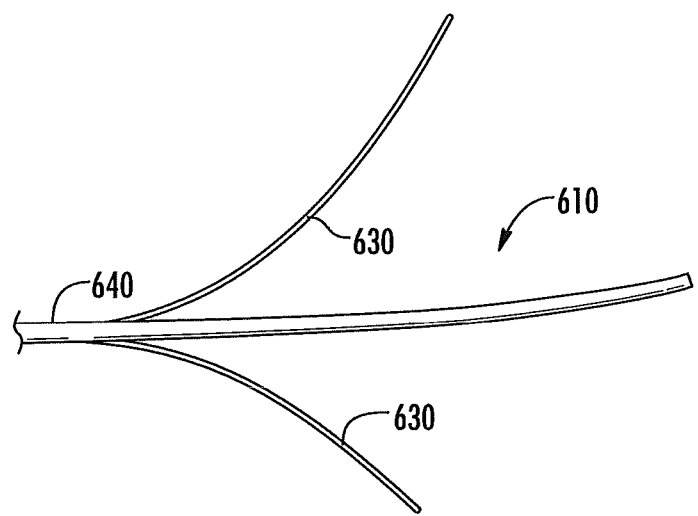
FIGS. 26 and 27 illustrate a method for measuring pull out force of a fiber optic cable.
Figure 27:
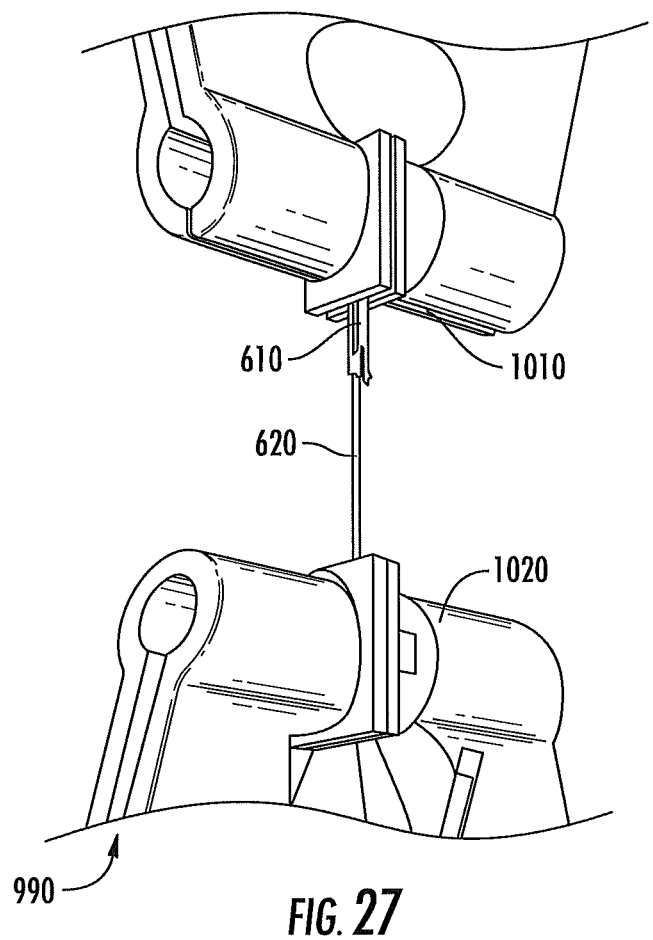

FIGS. 26 and 27 illustrate the method used to measure peak removal force, including the method for preparing a cable sample for measurement. The tested cable illustrated in FIGS. 26 and 27 corresponds to the cable 610 illustrated in FIG. 20. Peak removal force is measured using a load cell machine 990 (FIG. 27). The load cell machine 990 may be a Model 4201 load cell machine available from Instron® of Norwood Mass. In order to prepare the cable 610 for removal force testing, the cable is held in one hand, and the sides of the jacket 640 are cut away to expose the strength components 630, as shown in FIG. 26. A length of 0.5 meters of the jacket sides can be cut away. The strength components are separated from the jacket and cut back from the end of the cable. The cable end is cut in the grooves where the strength members were previously located, and the cable jacket halves are pulled to separate the jacket along the length of cable. The separated jacket halves can then be cut away to expose the fiber 620. Any remaining jacket and the strength components can be cut away so that the exposed fiber extends from the end of the cable. The opposite end of the cable sample is prepared by cutting a predetermined distance back from the exposed end of the cable. Referring to FIG. 27, the cable sample is placed in the testing machine 990. The jacket side of the cable is placed in one set of grips 1010 and the optical fiber 620 is held between the opposed set of grips 1020. The desired pull speed is set, and the machine 990 is run to record the peak force required to pull the fiber until the fiber is completely removed from the cable.

Referring back to Table 2, embodiments of the present invention are constructed to have pull out forces of less than 15 lbs using the above-described testing methodology. According to one embodiment, pull out forces are less than 11 lbs, can be less than eight lbs. According to yet another embodiment, pull out forces are less than two pounds. Low pull out forces are advantageous in that they facilitate connectorization in some processes, such as in connectorization with fiber access fixturing.

One exemplary fiber suitable for use in the above cables is a bend resistant multimode optical fibers comprising a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more downdopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns. In some embodiments that comprise a cladding with voids, the voids in some preferred embodiments are non-periodically located within the depressed-index annular portion. By "non-periodically located" we mean that when one takes a cross-section (such as a cross-section perpendicular to the longitudinal axis) of the optical fiber, the non-periodically disposed voids are randomly or non-periodically distributed across a portion of the fiber (e.g. within the depressed-index annular region). Similar cross-sections taken at different points along the length of the fiber will reveal different randomly distributed cross-sectional hole patterns, i.e., various cross-sections will have different hole patterns, wherein the distributions of voids and sizes of voids do not exactly match for each such cross-section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter. The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm. 50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm. Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm. In some embodiments, the numerical aperture ("NA") of the optical fiber is preferably less than 0.23 and greater than 0.17, more preferably greater than 0.18, and most preferably less than 0.215 and greater than 0.185. In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns. In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%. In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 28:
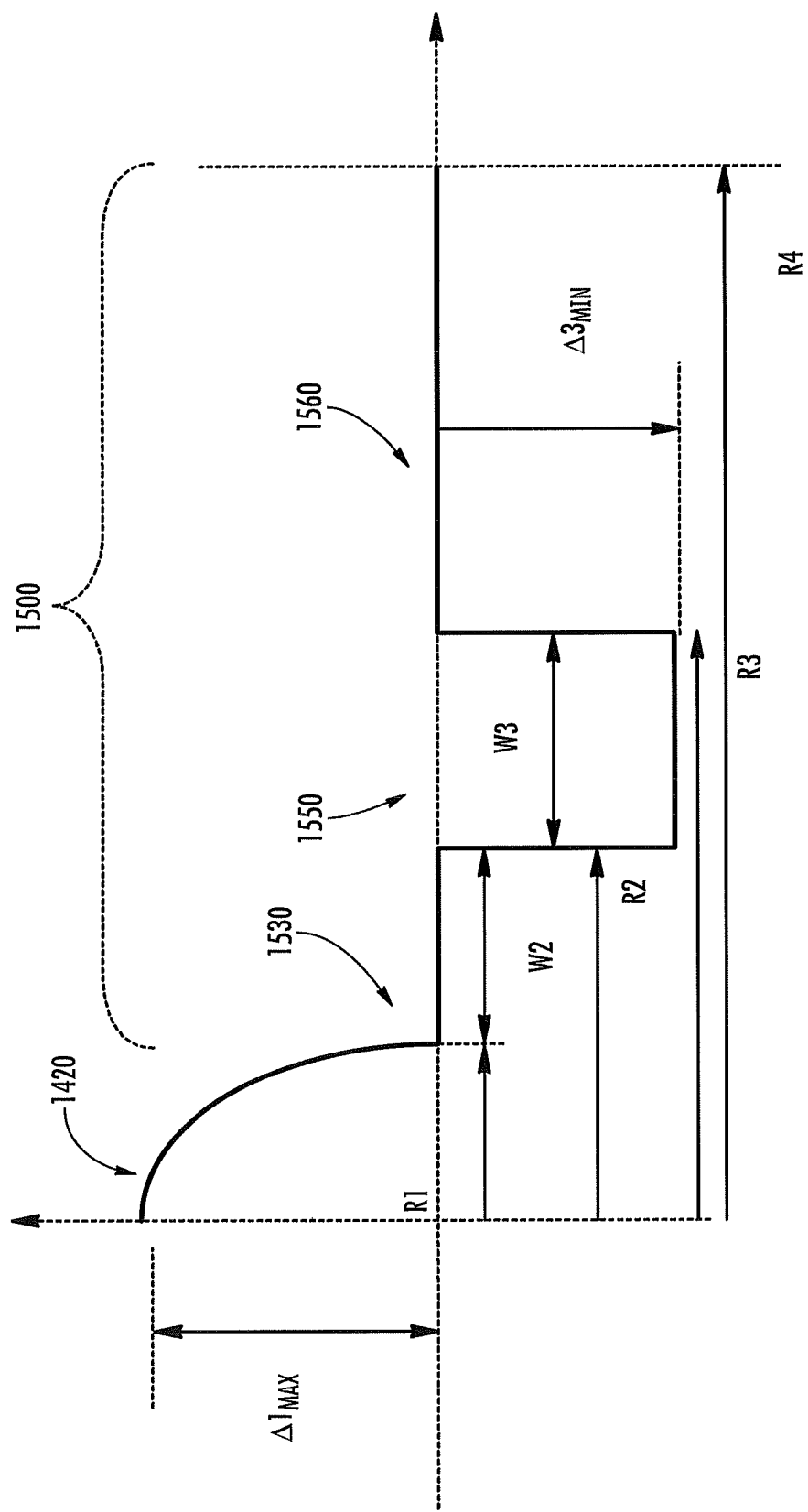
FIG. 28 is a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 29:
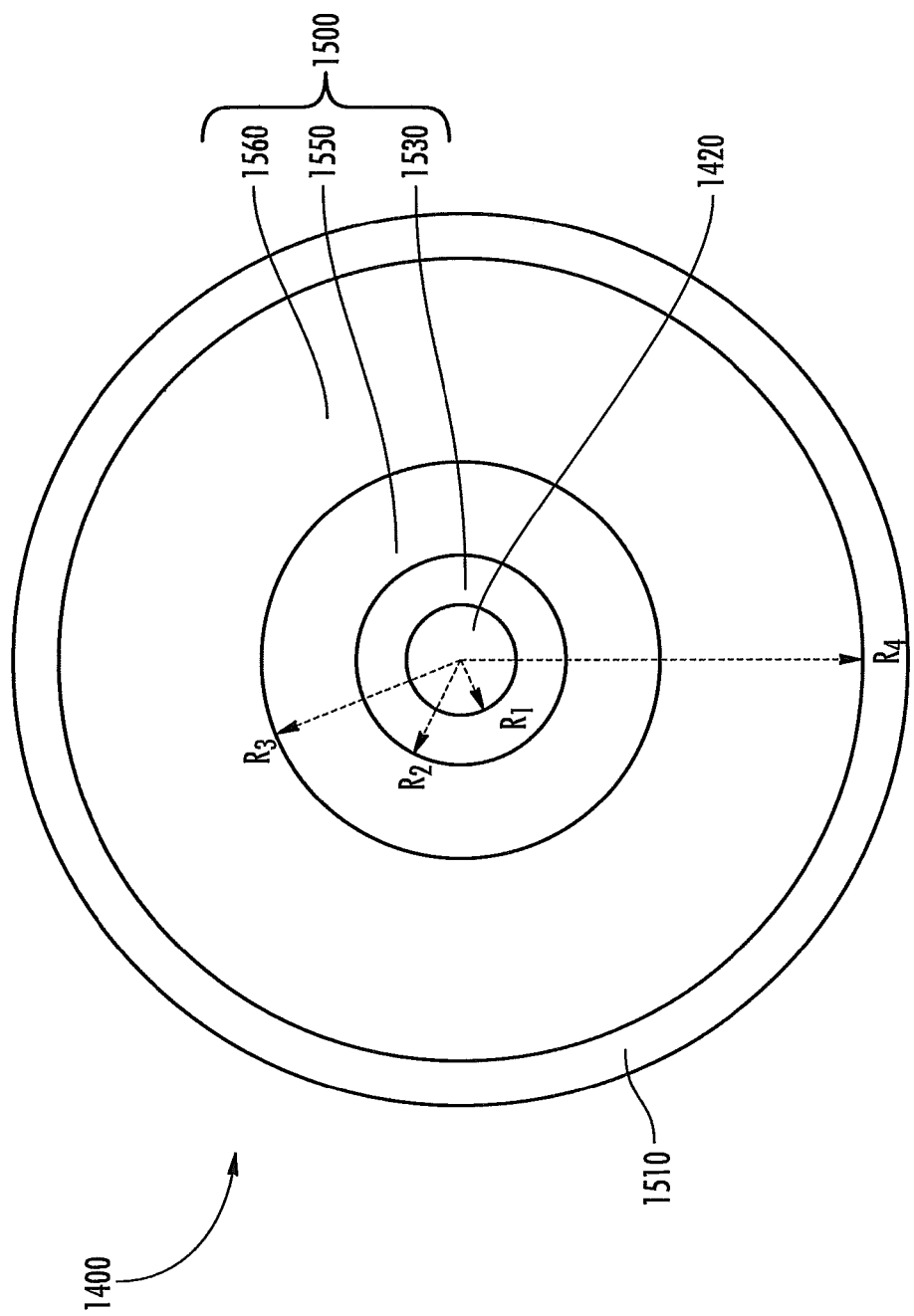
FIG. 29 is a schematic representation (not to scale) of a cross-sectional view of the optical waveguide fiber of FIG. 28.

FIG. 28 is a schematic representation of the refractive index profile of a cross-section of the glass portion of an embodiment of a multimode optical fiber 1400 comprising a glass core 1420 and a glass cladding 1500, the cladding comprising an inner annular portion 1530, a depressed-index annular portion 1550, and an outer annular portion 1560. FIG. 29 is a schematic representation (not to scale) of a cross-sectional view of the optical waveguide fiber of FIG. 28. The core 1420 has outer radius R1 and maximum refractive index delta $\Delta1MAX$. The inner annular portion 1530 has width W2 and outer radius R2. Depressed-index annular portion 1550 has minimum refractive index delta percent $\Delta3MIN$, width W3 and outer radius R3. The depressed-index annular portion 1550 is shown offset, or spaced away, from the core 1420 by the inner annular portion 1530. The annular portion 1550 surrounds and contacts the inner annular portion 1530. The outer annular portion 1560 surrounds and contacts the annular portion 1550. The clad layer 1500 is surrounded by at least one coating 1510, which may in some embodiments comprise a low modulus primary coating and a high modulus secondary coating. The inner annular portion 1530 has a refractive index profile $\Delta2(r)$ with a maximum relative refractive index $\Delta2MAX$, and a minimum relative refractive index $\Delta2MIN$, where in some embodiments $\Delta2MAX=\Delta2MIN$. The depressed-index annular portion 1550 has a refractive index profile $\Delta3(r)$ with a minimum relative refractive index $\Delta3MIN$. The outer annular portion 1560 has a refractive index profile $\Delta4(r)$ with a maximum relative refractive index $\Delta4MAX$, and a minimum relative refractive index $\Delta4MIN$, where in some embodiments $\Delta4MAX=\Delta4MIN$. Preferably, $\Delta1MAX>\Delta2MAX>\Delta3MIN$. In some embodiments, the inner annular portion 1530 has a substantially constant refractive index profile, as shown in FIG. 28 with a constant $\Delta2(r)$; in some of these embodiments, $\Delta2(r)=0\%$. In some embodiments, the outer annular portion 1560 has a substantially constant refractive index profile, as shown in FIG. 28 with a constant $\Delta4(r)$; in some of these embodiments, $\Delta4(r)=0\%$. The core 1420 has an entirely positive refractive index profile, where $\Delta1(r)>0\%$. R1 is defined as the radius at which the refractive index delta of the core first reaches value of 0.05%, going radially outwardly from the centerline. Preferably, the core 1420 contains substantially no fluorine, and more preferably the core 1420 contains no fluorine. In some embodiments, the inner annular portion 1530 preferably has a relative refractive index profile $\Delta2(r)$ having a maximum absolute magnitude less than 0.05%, and $\Delta2MAX<0.05\%$ and $\Delta2MIN>-0.05\%$, and the depressed-index annular portion 1550 begins where the relative refractive index of the cladding first reaches a value of less than -0.05%, going radially outwardly from the centerline. In some embodiments, the outer annular portion 1560 has a relative refractive index profile $\Delta4(r)$ having a maximum absolute magnitude less than 0.05%, and $\Delta4MAX<0.05\%$ and $\Delta4MIN>-0.05\%$, and the depressed-index annular portion 1550 ends where the relative refractive index of the cladding first reaches a value of greater than -0.05%, going radially outwardly from the radius where $\Delta3MIN$ is found.

Figure 30:
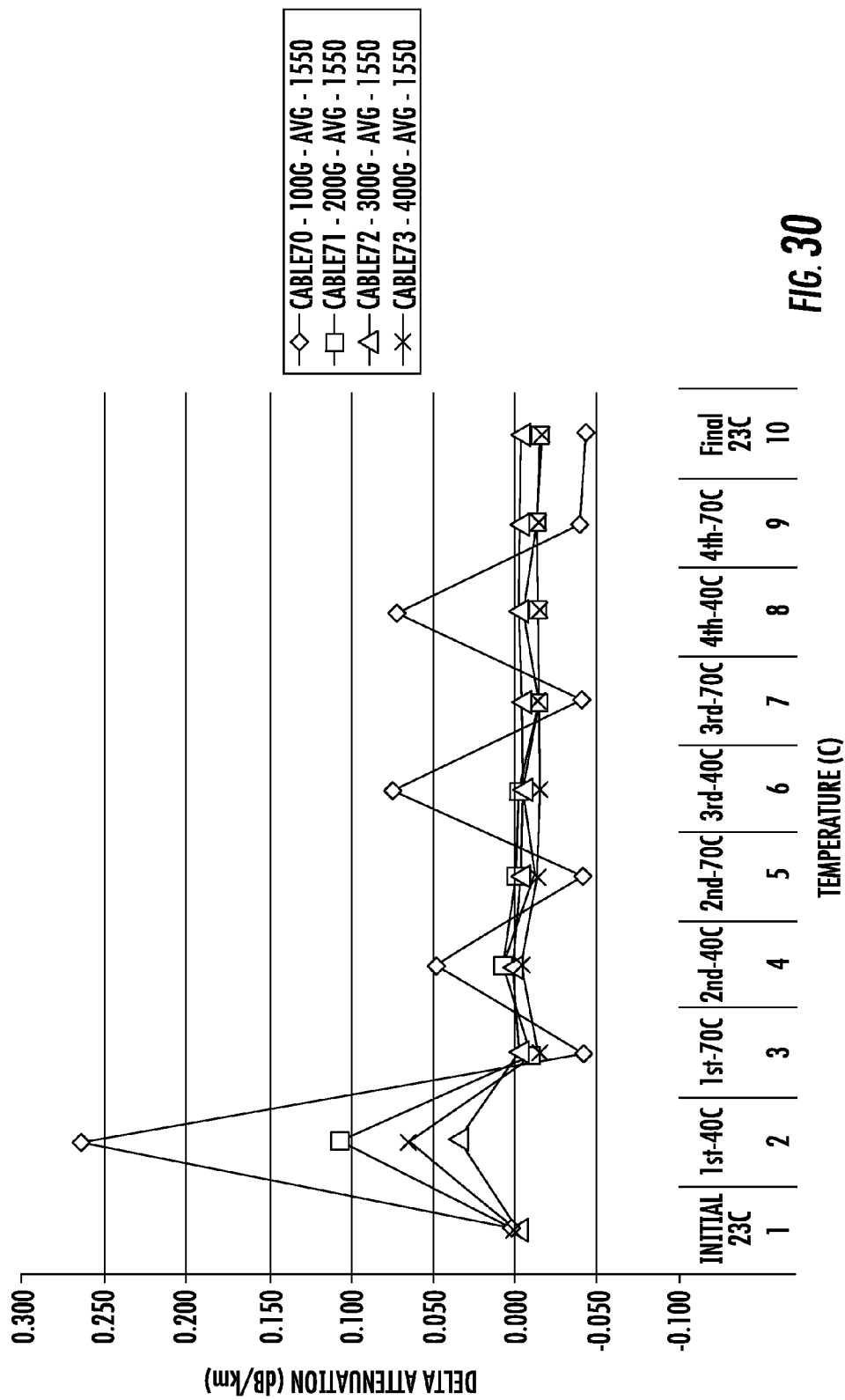
FIG. 30 is a plot of delta attenuation for test cables at various temperatures cyclings.

FIG. 30 illustrates delta attenuation values for cables having optical fibers paid off at varying tensions. The optical cables for which test data is illustrated in FIG. 30 generally correspond in shape and composition to the fiber optic cable 610 illustrated in FIG. 20. Delta attenuation for the cables is indicated on the vertical axis in dB per kilometer of cable. Delta attenuation was measured for each test cable T70, T71, T72 and T73 at the temperature cycles illustrated along the horizontal axis. The test frequency was 1550 nm.

Figure 31:
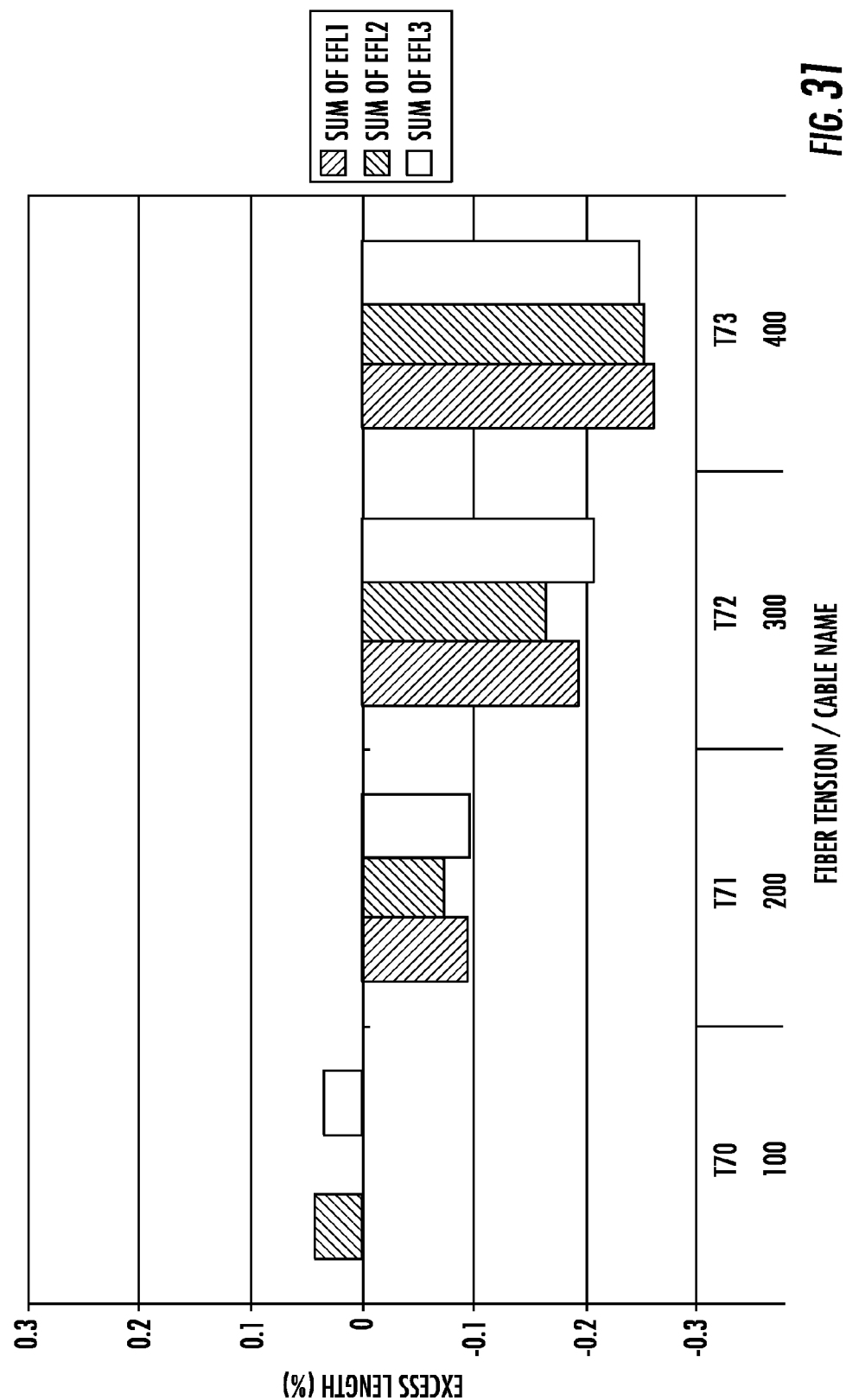
FIG. 31 is a graph of excess fiber length for test cables.

As shown in FIG. 30, the test cable T70 was paid off at 100 g-force tension and experienced relatively high delta attenuation, particularly at the first temperature cycling at -40° C. The test cables T71 and T72 were paid off at 200 and 300 g-force respectively and exhibited significantly lower delta attenuation over the same temperature cycling as the cable T70. The test cable T73 was paid off at 400 g-force and also exhibited significantly lower delta attenuation over the same temperature cycling as the cable T70. Attenuation values for cables T71-T73 at -40° C. were all below 0.15 db/km while the attenuation for the cable T70 exceeded 0.25 db/km. FIG. 31 illustrates EFL data for the test cables T70-T73.

Figure 32:
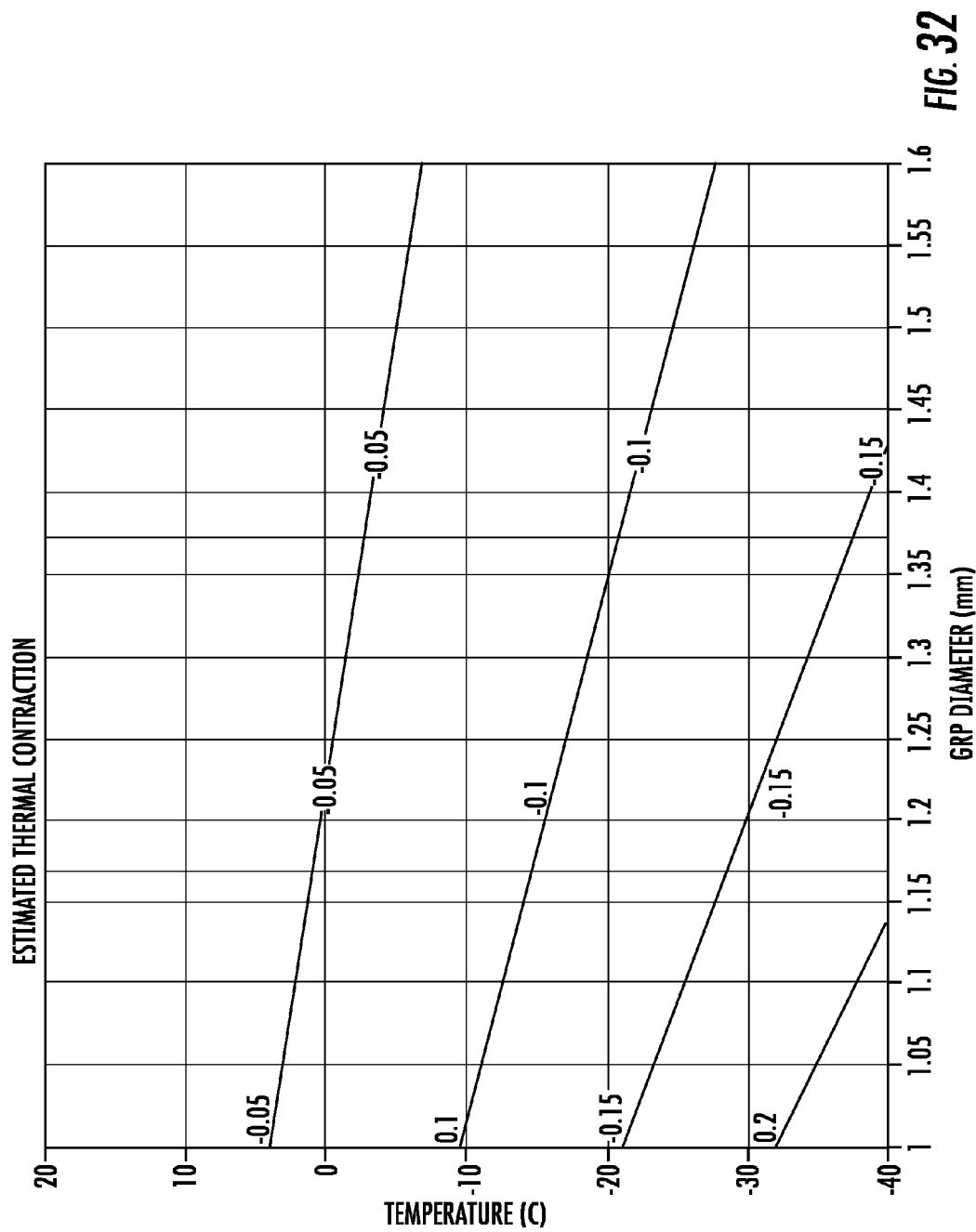
FIG. 32 is a plot of simulated cable contraction for varying temperatures and reinforcing component diameters.

FIG. 32 illustrates estimated thermal contraction data for the test cables T70-T73. Temperature is indicated on the vertical axis, strength component diameter is indicated on the horizontal axis, with isometric lines indicating estimated thermal contraction of the cable plotted. According to one aspect of the invention, EFL is controlled such that positive strain is present in the optical fiber after manufacture of the cable. The fiber strain at room temperature (25° C.) for the cable may be, for example, in the range of 0.1-0.3%. In one embodiment, the fiber strain is about 0.2%. With a fiber strain of 0.2%, the strain in the fiber may reduce to approximately zero at -40° C. as the fiber shrinks, resulting in extremely low optical attenuation due to bending. At another exemplary data point, the temperature is -40° C. and the strength component diameter is 1.25 mm. The EFL, which is about -0.2% at room temperature, approaches zero with the concomitant shrinkage in the cable, which is approximately 0.175% at -40° C.

Suitable fibers for use in the present cable embodiments are ClearCurve® single mode and multimode fibers available from Corning Incorporated of Corning N.Y. The fibers used in the cables described in this specification can be, for example, buffered fibers, coated fibers (e.g., 50 micron coated fibers), tight-buffered fibers, and non tight-buffered fibers. For the purposes of this specification, when it is stated that a "fiber" is "adjacent to" or "contacting" a jacket, this description encompasses contact of a fiber buffer layer, an applied fiber coating, a fiber color layer, and release layers such as oils, with the jacket. In the illustrated embodiments, for example, the fibers include bare fiber with coating, and an applied color layer coating.

Many modifications and other embodiments of the present invention, within the scope of the claims will be apparent to those skilled in the art. For instance, the concepts of the present invention can be used with any suitable composite cable designs and/or optical stub fitting assemblies. Thus, it is intended that this invention covers these modifications and embodiments as well those also apparent to those skilled in the art.

What is claimed is:

1. A fiber optic cable comprising:
an optical fiber comprising a glass core, a glass cladding, and a polymer coating, wherein the optical fiber is a bend-resistant optical fiber, such that:
attenuation at a wavelength of 850 nanometers in the optical fiber increases less than 0.5 decibels when the optical fiber is wrapped one turn around a mandrel that is 10 millimeters in diameter, and
the attenuation at the 850 nanometers wavelength in the optical fiber increases less than 0.2 decibels when the optical fiber is wrapped one turn around a mandrel that is 20 millimeters in diameter;
strength components on opposite sides of the optical fiber; and
a polymeric cable jacket, wherein the cable jacket surrounds the optical fiber and the strength components, and wherein strain is present in the optical fiber at room temperature (25° C.).

2. The fiber optic cable of claim 1, wherein the cladding of the optical fiber comprises annular portions, and wherein a first of the annular portions of the cladding has a lesser index of refraction than a second of the annular portions.

3. The fiber optic cable of claim 2, wherein at least one of the annular portions of the cladding comprises doped glass.

4. The fiber optic cable of claim 1, wherein the cable jacket is contacting and tightly drawn onto the optical fiber without bonding to the optical fiber.

5. The fiber optic cable of claim 1, wherein a cross-sectional area of the fiber optic cable is in the range of 8 to 22 square millimeters and the fiber optic cable has a cross-sectional width in the range of 3 to 6 millimeters.

6. The fiber optic cable of claim 5, wherein the fiber optic cable has a weight of 19 kilograms or less per kilometer.

7. The fiber optic cable of claim 1, wherein the cable jacket has a medial height disposed about the optical fiber and an end height disposed about at least a portion of the strength components, and wherein the medial height is less than the end height.

* * * * *